(12) United States Patent
Yang et al.

(10) Patent No.: US 8,457,098 B2
(45) Date of Patent: Jun. 4, 2013

(54) DATA OFFLOADING AT WIRELESS NODE

(75) Inventors: Jin Yang, Orinda, CA (US); Kalyani Bogineni, Hillsborough, NJ (US); Praveen Atreya, Jersey City, NJ (US); Xuming Chen, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 494 days.

(21) Appl. No.: 12/695,232

(22) Filed: Jan. 28, 2010

(65) Prior Publication Data
US 2011/0182249 A1 Jul. 28, 2011

(51) Int. Cl.
*H04W 40/02* (2009.01)

(52) U.S. Cl.
USPC .......... 370/349; 370/395.2; 709/239

(58) Field of Classification Search
None
See application file for complete search history.

(56) References Cited

U.S. PATENT DOCUMENTS

| | | |
|---|---|---|
| 7,280,546 B1 | 10/2007 | Sharma et al. |
| 7,346,025 B2 | 3/2008 | Bryson |
| 7,570,945 B2 | 8/2009 | Lee et al. |
| 7,593,337 B2 | 9/2009 | Oguchi et al. |
| 8,228,915 B2 * | 7/2012 | Meyer et al. .......... 370/392 |
| 2007/0135123 A1 | 6/2007 | Chin et al. |
| 2008/0020745 A1 | 1/2008 | Bae et al. |
| 2008/0080399 A1 | 4/2008 | Wang et al. |
| 2008/0181411 A1 | 7/2008 | Norrman et al. |
| 2009/0191862 A1 | 7/2009 | Amirijoo et al. |
| 2009/0274107 A1 | 11/2009 | Park et al. |
| 2010/0020710 A1 | 1/2010 | Gupta et al. |
| 2010/0039987 A1 * | 2/2010 | Hegde et al. .......... 370/328 |

* cited by examiner

*Primary Examiner* — Kwang B Yao
*Assistant Examiner* — Alex Skripnikov

(57) ABSTRACT

A method performed by a wireless node includes receiving a data flow associated with user devices; performing a packet inspection of the data flow; determining whether a network address of the wireless node matches another network address associated with the data flow; converting the other network address to a layer 2 identifier when the other network address matches the network address; establishing a bearer link within the wireless node based on the layer 2 identifier; and offloading the data flow from layers of a network, which are higher relative to the wireless node, to the bearer link, wherein the data flow does not traverse the layers.

21 Claims, 24 Drawing Sheets

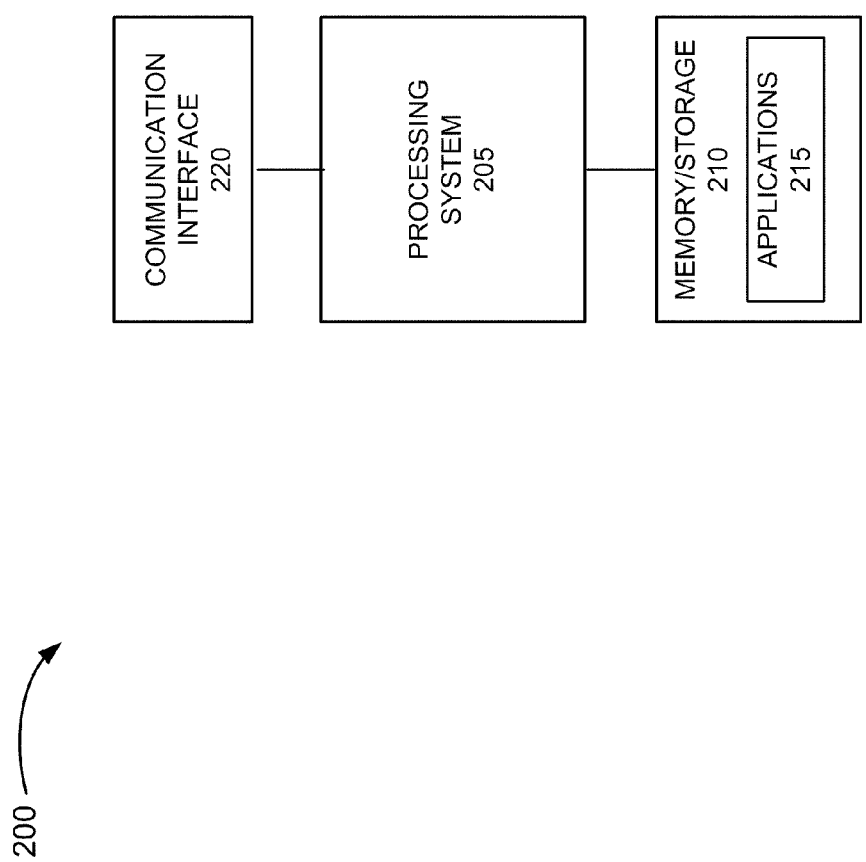

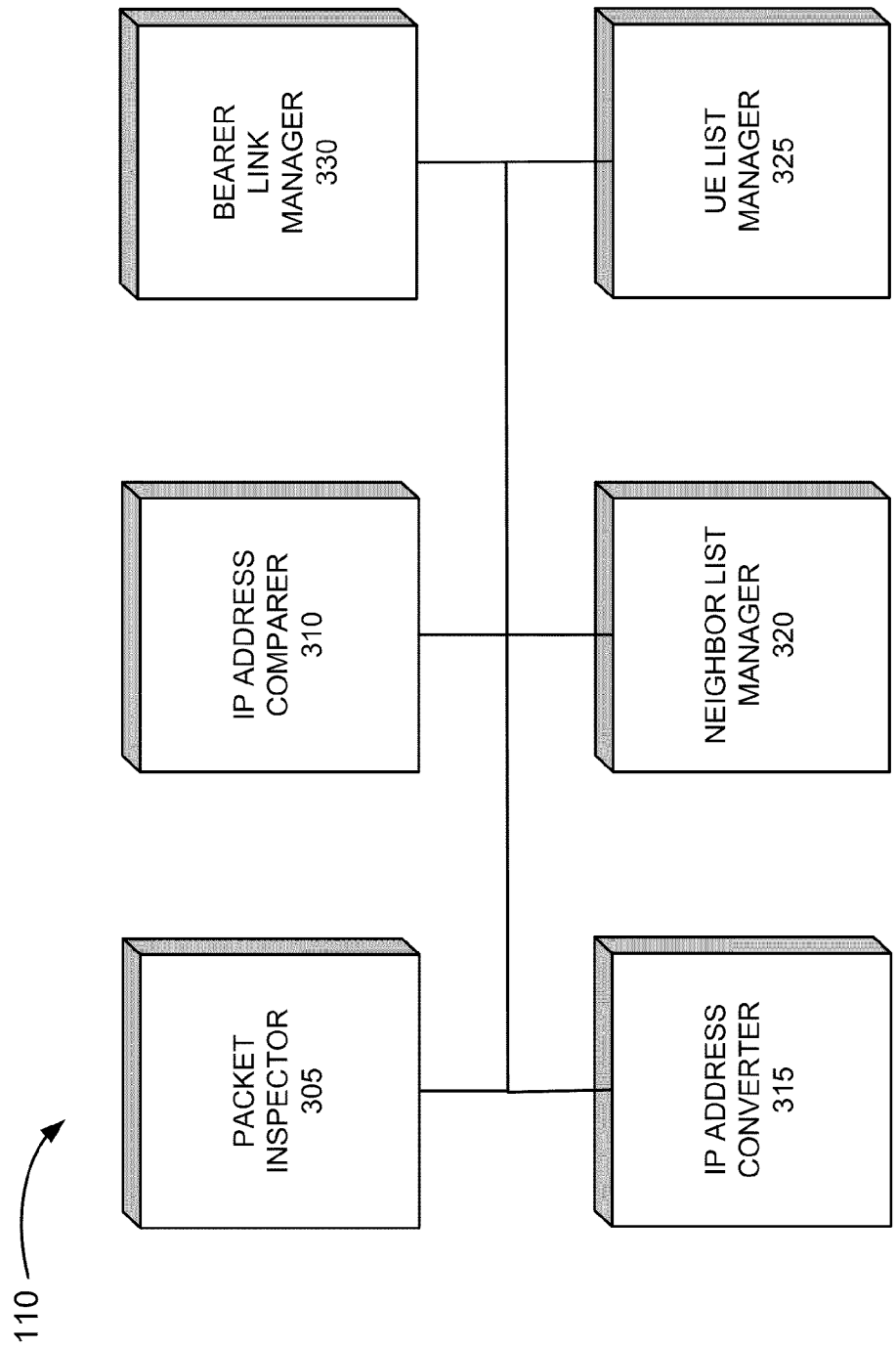

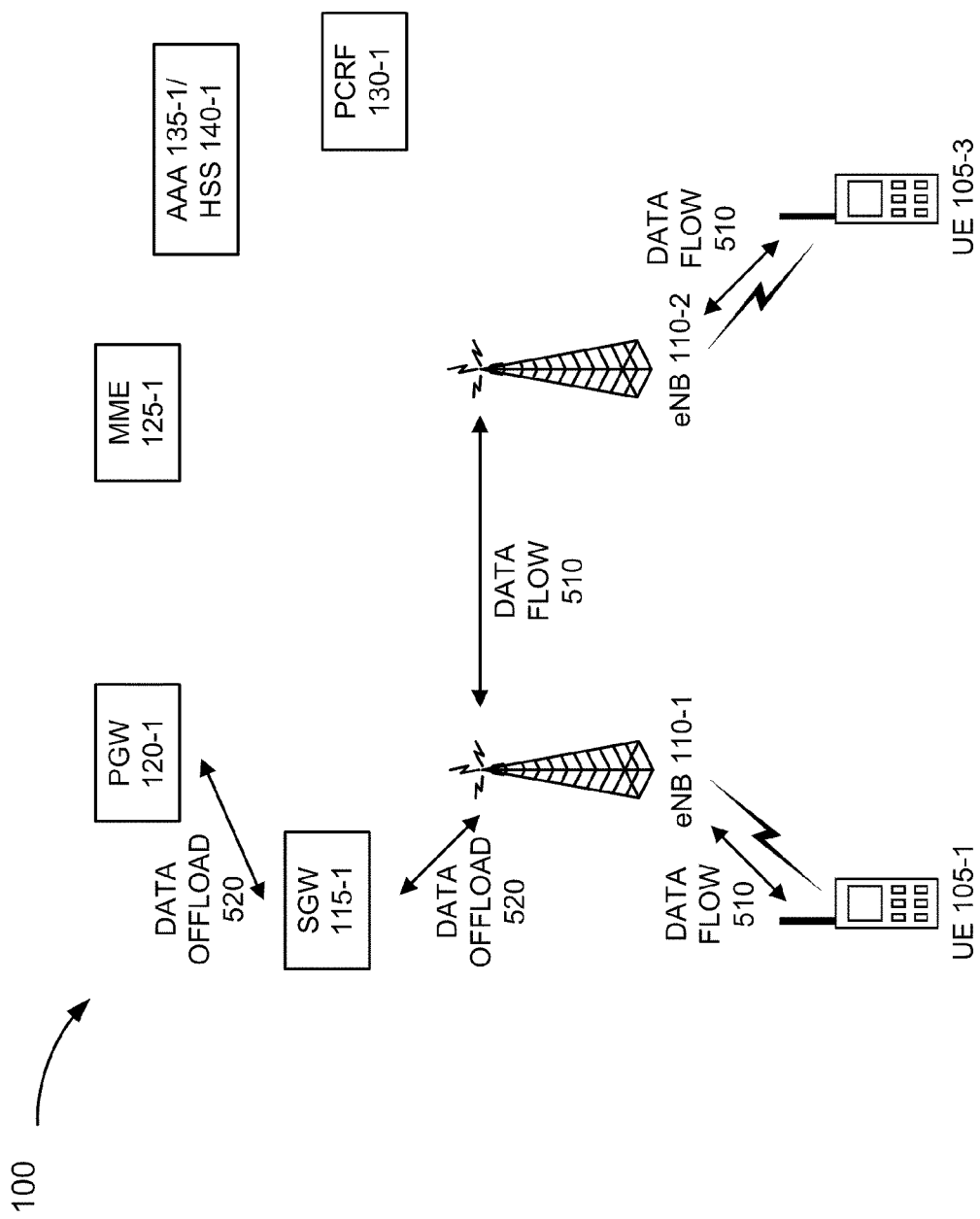

DATA OFFLOADING AT WIRELESS NODE

BACKGROUND

As network operators and service provides strive to provide new or improved services and/or assets to users, network demands may correspondingly increase. As a result, network operators and service providers must confront a host of challenges to ensure quality of service (QOS) and other performance metrics are maintained.

BRIEF DESCRIPTION OF THE DRAWINGS

FIG. 2 is a diagram illustrating exemplary components of a device that may correspond to one or more of the devices in the exemplary environment;

FIG. 3A is a diagram illustrating exemplary functional components associated with an exemplary eNB;

FIGS. 5A-5E are diagrams illustrating another exemplary implementation in which data offloading may be performed between two neighboring eNBs;

DETAILED DESCRIPTION OF PREFERRED EMBODIMENTS

Figure 1A:
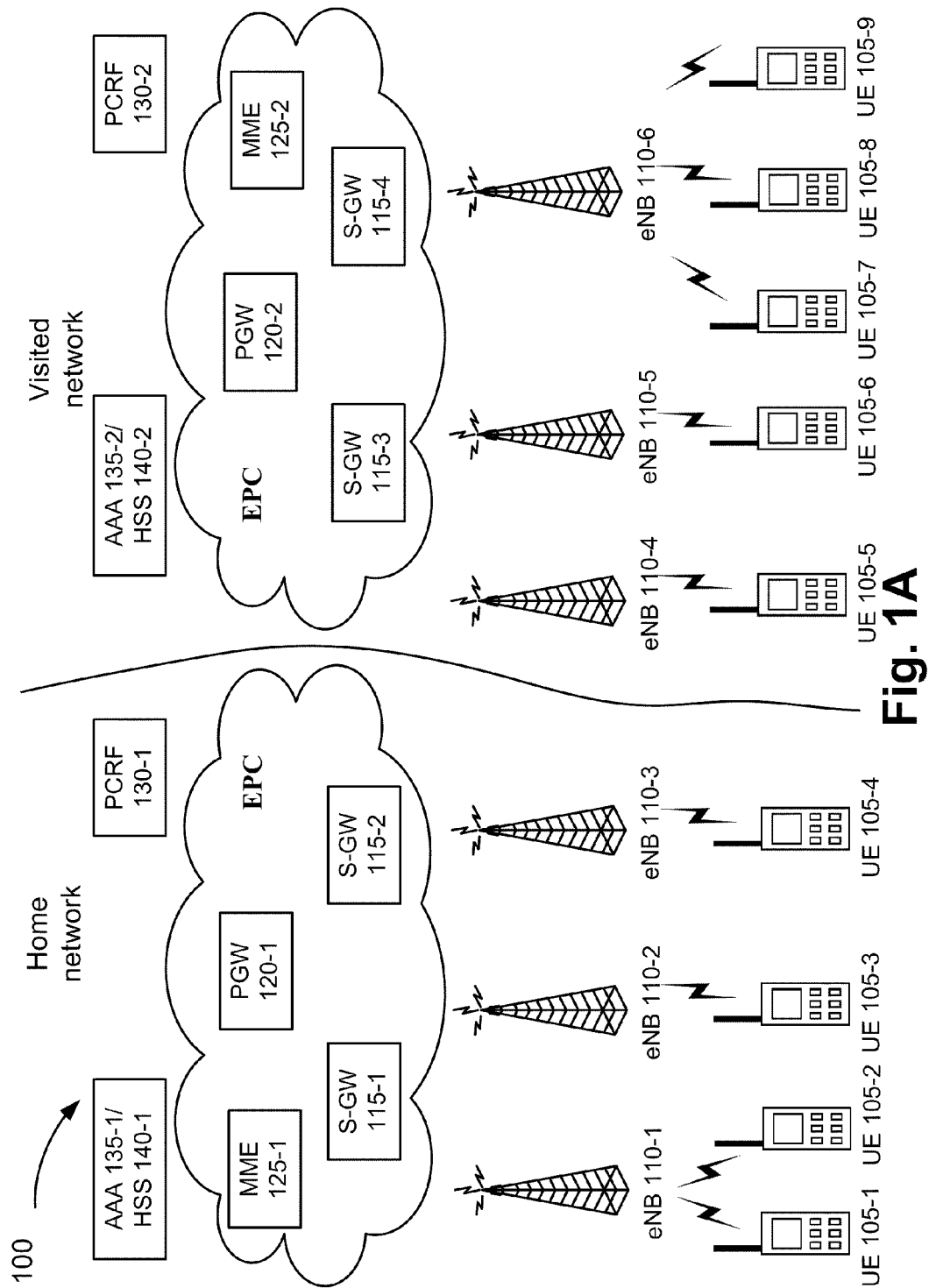
FIG. 1A is a diagram illustrating an exemplary environment in which data offloading may be implemented.

The following detailed description refers to the accompanying drawings. The same reference numbers in different drawings may identify the same or similar elements. Also, the following detailed description does not limit the invention.

The term "wireless node," is intended to be broadly interpreted to include a device that wirelessly communicates with a user device (e.g., user equipment (UE)). By way of example, but not limited thereto, a wireless node may correspond to an evolved Node B (eNB), a base station (BS), a base station controller (BSC), a Node B, a base transceiver station (BTS), a relay node, a repeater, a home eNB, a radio node, or a UE-gateway (UE-GW). The wireless node may support one access and/or wireless technology or multiple access and/or wireless technologies.

The term "data offloading," as used herein, is to be broadly interpreted to include providing user device-to-user device data flow (e.g., not including signaling flow) between users as locally as possible toward the users. In an exemplary implementation, the data flow may correspond to link layer data. By way of example, but not limited thereto, link layer data may comprise compressed and/or encoded voice data, compressed and/or encoded video data, or other multimedia data, etc.

By way of example, but not limited thereto, within a Long Term Evolution (LTE) network, data offloading may permit a data flow to traverse one or more wireless nodes (e.g., one or more eNBs) to which user devices may be attached without traversing higher layers of the LTE network (e.g., a serving gateway (SGW), a packet data network (PDN) gateway (PGW)). However, it will be appreciated that data offloading may be applicable to networks other than LTE. In this regard, the term "network," as used herein, is intended to be broadly interpreted to include a wireless network (e.g., mobile network, cellular network, non-cellular network, etc.). By way of example, but not limited thereto, data offloading may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, and/or another type of wireless network (e.g., an ad hoc network, etc.), or some other type of wired network.

Depending on the type of network, data offloading may be performed by wireless nodes not specifically described herein but yet provide corresponding functionality. By way of example, but not limited thereto, data offloading may be performed by a BS, a BSC, a Node-B, a network access device, a serving GPRS support node (SGSN), etc. Data offloading may be applied per user (e.g., all data flows) and/or per user per data flow In an exemplary implementation within a network, eNBs may be permitted to initiate and support peer-to-peer routing so that data flows between users which may normally traverse higher layers of the network (e.g., network devices in an evolved packet core (EPC)) may not traverse these higher layers. By way of example, but not limited thereto, data flows that normally traverse a serving gateway (SGW) and a packet gateway (PGW) of the EPC may not traverse the SGW and the PGW.

FIG. 1A is a diagram illustrating an exemplary network 100 in which data offloading may be implemented. As illustrated in FIG. 1A, exemplary network 100 may include UEs 105-1 through 105-9 (referred to generally as UE 105 or UEs 105), eNBs 110-1 through 110-6 (referred to generally as eNB 110 or eNBs 110), SGWs 115-1 through 115-4 (referred to generally as SGW 115 or SGWs 115), PGWs 120-1 and 120-2 (referred to generally as PGW 120 or PGWs 120), mobility management entities (MMEs) 125-1 and 125-2 (referred to generally as MME 125 or MMEs 125), policy and charging rules function (PCRF) devices 130-1 and 130-2 (referred to generally as PCRF devices 130 or PCRF device 130), and authentication, authorization, and accounting (AAA) servers 135-1 and 135-2/home subscriber servers (HSSs) 140-1 and 140-2 (referred to generally as AAAs 135/HSSs 140 or AAA 135/HSS 140). As depicted in FIGS. 1A-1D, network 100 may include a home network and a visited network in which data offloading may be applied to non-roaming and roaming scenarios.

The number of devices and configuration in network 100 is exemplary and provided for simplicity. In practice, network 100 may include more devices, fewer devices, different devices, and/or differently arranged devices than those illustrated in FIG. 1A. For example, network 100 may include another type of gateway, a relay node (RN), a home eNB (HeNB)/femtocell/picocell, a repeater, a radio node, a UE-GW, etc. Additionally, or alternatively, network 100 may include additional networks and/or different networks than those illustrated in FIG. 1A. For example, network 100 may include public and/or private Internet Protocol (IP) networks and/or other types of networks, resources, assets, services, Application Service Providers (ASPs), other operators that may host applications, etc. Also, some functions described as being performed by a particular device (e.g., a wireless node, etc.) may be performed by a different device or a combination of devices. Additionally, or alternatively, although FIG. 1A illustrates separate instances of MME 125, PGW 120, SGW 115, etc., in other implementations, two or more of these devices may be combined. For example, MME 125 may be combined with SGW 115, or PGW 120 may be combined with SGW 115, PCRF 130 may be combined with PGW 120, etc. Network 100 may include wired and/or wireless connections among the devices illustrated.

UE 105 may include a device having the capability to communicate with other devices, systems, networks, and/or the like. For example, UE 105 may include a wireless telephone, an IP telephone, a computer (e.g., a laptop, a palmtop, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, user device, and/or vehicle-based device. In an exemplary implementation, UE 105 may operate according to one or more versions of the LTE communication standard. In other implementations, UE 105 may operate according to one or more other wireless and/or wired network standards.

ENB 110, SGW 115, PGW 120, and MME 125 may include network devices or entities that operate according to one or more versions of the LTE communication standard. Additionally, eNB 110, SGW 115, PGW 120, and MME 125 may perform functions associated with data offloading, in addition to those provided by the LTE communication standard, as will be described below. According to an exemplary implementation of the LTE communication standard, SGW 115, PGW 120, and MME 125 may form an Evolved Packet Core (EPC) network.

PCRF device 130 may include a device that may manage bandwidth, charging rates, and policies. AAA server 135 may include a device that may provide authentication, authorization, and accounting services. HSS 140 may include a device that may provide subscriber data storage for subscription-related information (e.g., subscriber profiles, etc.). HSS 140 may also provide other services (e.g., authentication, authorization, etc.).

According to one or more LTE communication standards, IP address allocation and registration for UEs 105 may be carried out at PGW 120. Further, data flows between UEs 105 may propagate via various devices and/or entities in the EPC. For example, data flows may propagate via SGW 115 and PGW 120. However, such communication paths may result in significant inefficiencies (e.g., resource utilization inefficiencies, latency, etc.) when UEs 105 may be attached to the same eNB 110 or neighbor eNBs 110.

In an exemplary embodiment, eNBs 110 may offload data flows from SGW 115 and PGW 120 so that data flows may not traverse SGW 115 and PGW 120. ENBs 110 may communicate using the IP transport network and routing between eNBs 110 may be based on IP addresses. In an exemplary implementation, a destination eNB 110 may receive a data flow and identify a layer 3 IP address of a source eNB 110 associated with the data flow. The destination eNB 110 may compare the layer 3 IP address of the source eNB 110 with the layer 3 IP address of the destination eNB 110. In an exemplary implementation, if there is a match (e.g., the source eNB 110 corresponds to the destination eNB 110), the source/destination eNB 110 may convert the layer 3 IP address of the source eNB 110 to a combination of a Cell Global Identification (CGI)/a Physical Cell Identification (PCI). Additionally, the source/destination eNB 110 may convert an IP address associated with a source UE 105 (e.g., the caller UE) to a physical identifier (e.g., Cell Radio Network Temporary Identifier (C-RNTIs), a RNTI, etc., or some other type of identifier). The source/destination eNB 110 may establish the data flow within the source/destination eNB 110.

In the instance that there is not a match, the destination eNB 110 may access an eNB neighbor list to determine whether the source eNB 110 is a neighbor eNB 110 of the destination eNB 110. If the source eNB 110 is a neighbor of the destination eNB 110, the destination eNB 110 may perform a similar conversion as described above, and establish a data flow between the source eNB 110 and the destination eNB 110. In the instance that the source eNB 110 is not a neighbor eNB 110, the data flow may proceed via SGW 115 and PGW 120. In an exemplary implementation, the destination eNB 110 may verify whether data offloading is permitted. By way of example, but not limited thereto, the destination eNB 110 may request authorization from one or more of MME 125, PCRF 130, AAA 135/HSS 140, etc. Additionally, in an exemplary implementation, when data offloading is performed, the source eNB 110 may inform SGW 115 and/or PGW 120 about the data offloading.

As a consequence of data offloading, significant efficiencies may be gained. For example, higher layer network devices may be alleviated from congestion, may utilize less resources, may have more time and resources to convey inter-sector and inter-network traffic, and/or may produce enhanced fidelity (e.g., by avoiding or minimizing additional processing, such as compression/decompression, encoding/decoding, etc., as the data flow traverses the communication path), etc. Additionally, communication between UEs 105 may involve fewer hops, improve end-to-end latency, etc.

Data offloading may be applied to a variety of data flows (e.g., peer-to-peer applications, mobile-to-mobile flows, etc.). Additionally, data offloading may be applied per user, per application, per data flow per user, etc. Data offloading may be applied within a same operator network or between different operator networks.

Figure 1B:
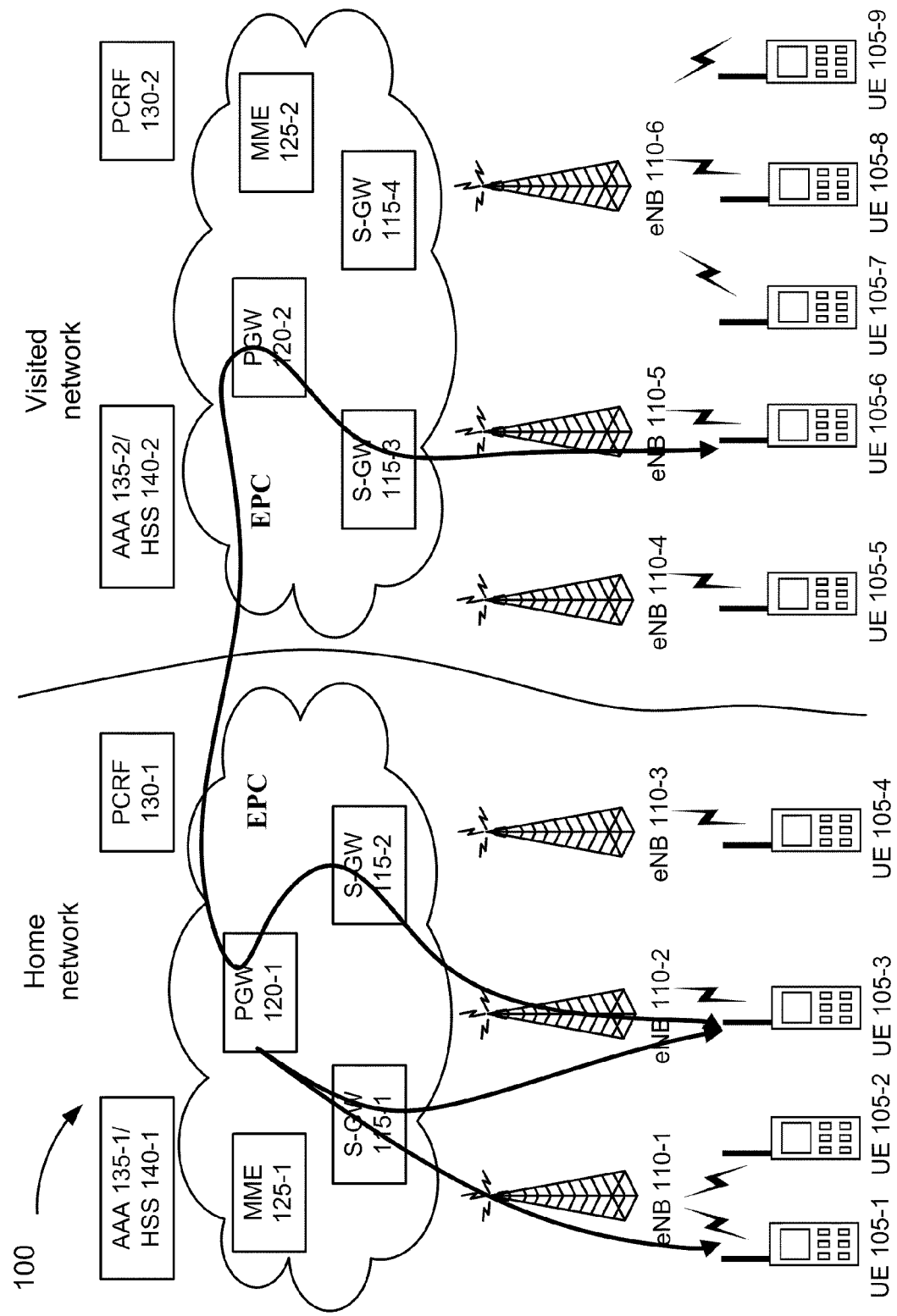
FIG. 1B is a diagram illustrating a normal communication path traversing an evolved packet core (EPC)

In an exemplary implementation, when data offloading may not be performed, normal communication may proceed over the EPCs, as defined in the LTE communication standard. For example, as illustrated in FIG. 1B, when UE 105-1 and UE 105-3 communicate within the same operator network, a data flow may traverse S-GW 115-1 and PGW 120-1. As further illustrated in FIG. 1B, when UE 105-3 and UE 105-6 may communicate within different operator networks, a data flow may traverse PGW 120-1 and PGW 120-2.

Figure 1C:
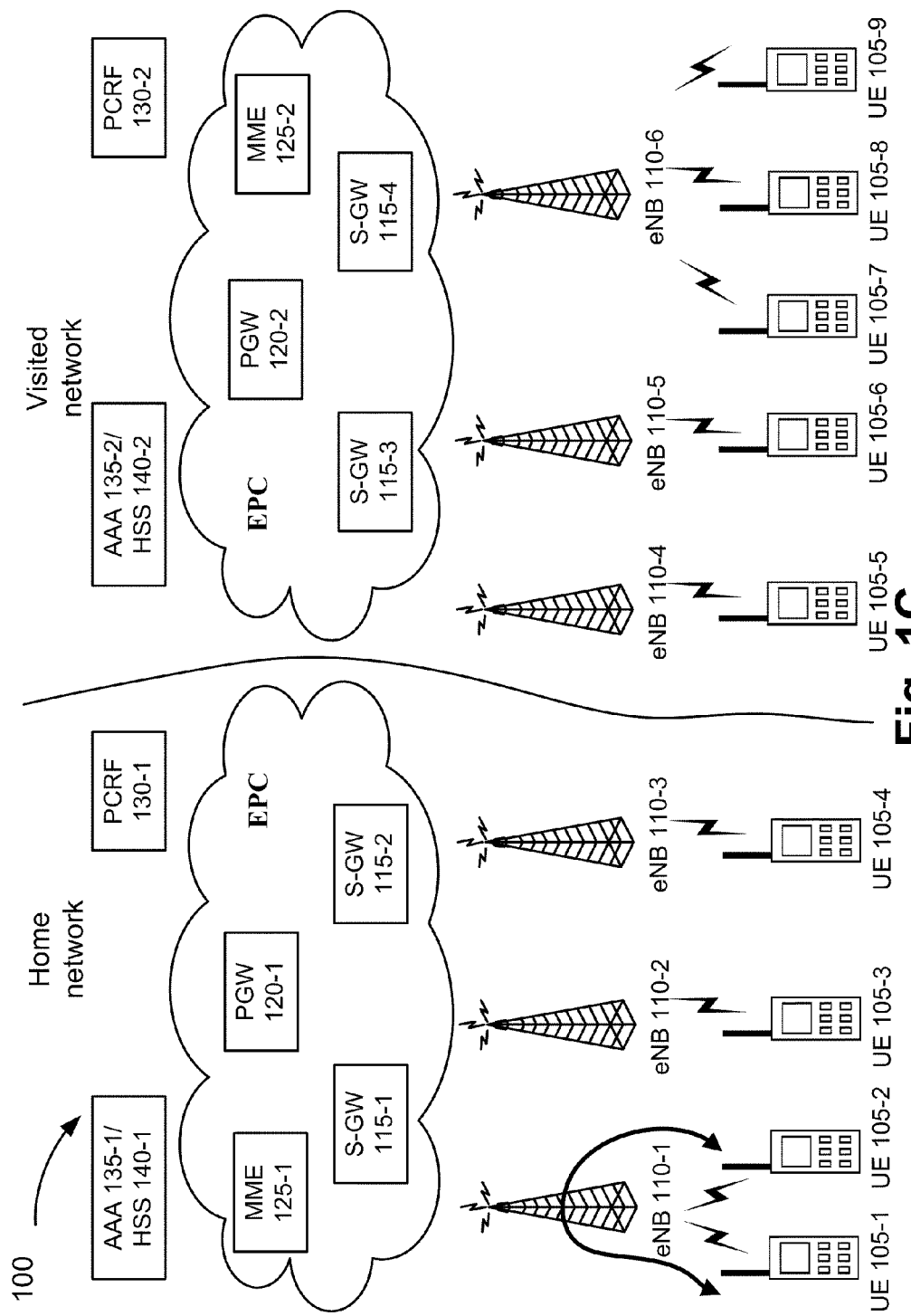
FIG. 1C is a diagram illustrating an exemplary communication path in which data offloading may be performed within the same wireless node.
Figure 1D:
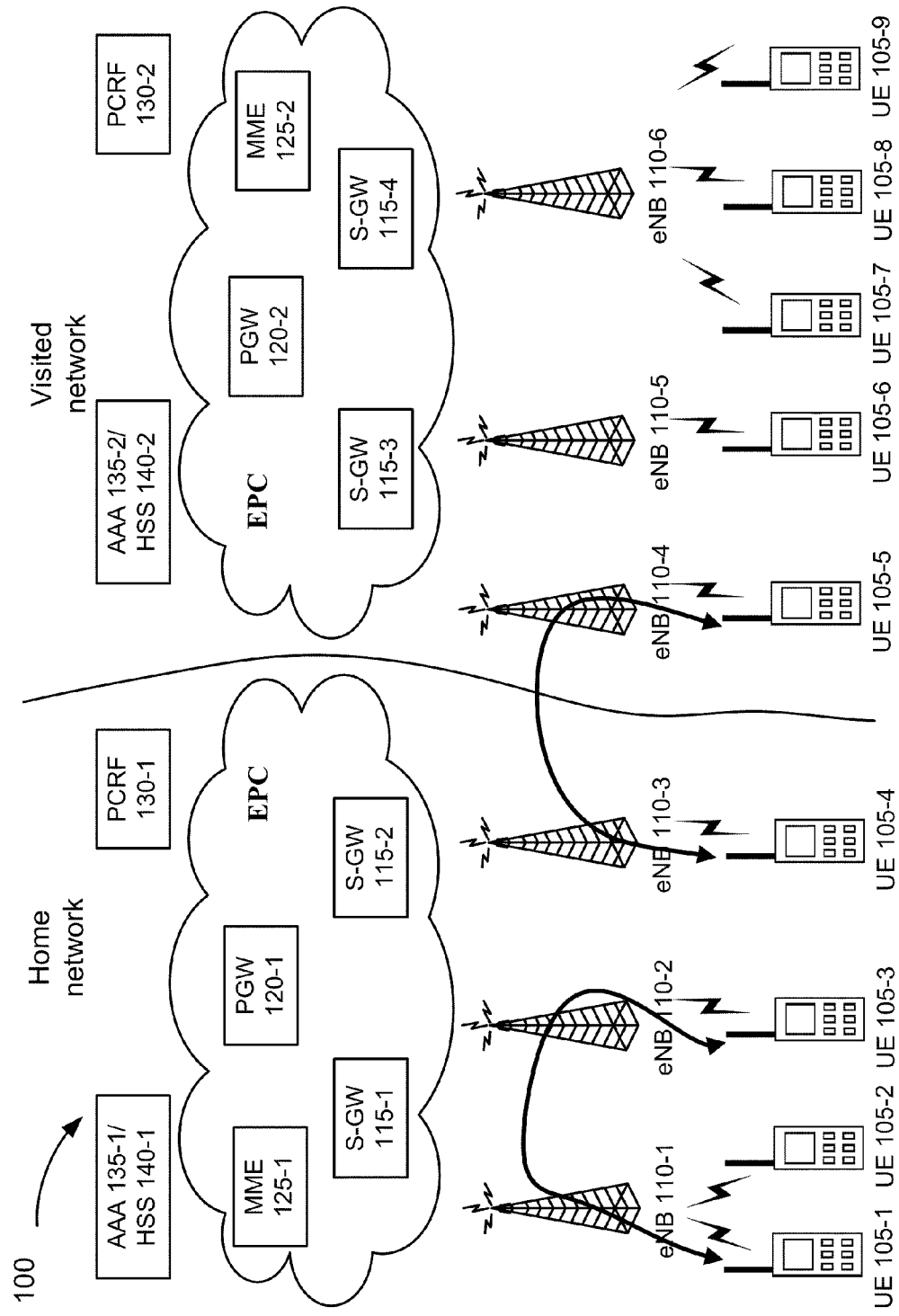
FIG. 1D is a diagram illustrating an exemplary communication path in which data offloading may be performed between neighboring wireless nodes.

In contrast, in an exemplary implementation when data offloading is performed, as illustrated in FIG. 1C, UEs 105-1 and 105-2 may communicate via eNB 110-1 within the same operator network without involving SGW 115-1 and PGW 120-1. Additionally, in another exemplary implementation, as illustrated in FIG. 1D, data offloading may be performed when UEs 105 may be attached to different eNBs 110 without involving SGW 115 and PGW 120. For example, UEs 105-1 and UE 105-3 may communicate via eNB 110-1 and eNB 110-2 within the same operator network, or UE 105-4 and UE 105-5 may communicate via eNB 110-3 and eNB 110-4 within different operator networks in which data flows may not traverse S-GW 115 and PGW 120.

Since an exemplary embodiment has been broadly described, a more detailed description is provided below.

FIG. 2 is a diagram illustrating exemplary components of a device 200 that may correspond to one or more of the devices in network 100. For example, device 200 may correspond to PGW 120, SGW 115, eNB 110, as well as other devices (e.g., MME 125, UE 105, etc.), depicted in FIGS. 1A-1D. As illustrated, device 200 may include a processing system 205, memory/storage 210 including applications 215, and a communication interface 220. In other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215). Processing system 205 may perform various communication-related processing, such as, for example, modulation, demodulation, error detection, multiplexing, de-multiplexing, filtering, coding, de-coding, etc.

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. For example, with reference to PGW 120, SGW 115, and eNB 110, applications 215 may include one or more applications for providing data offloading.

Communication interface 220 may permit device 200 to communicate with other devices, networks, systems and/or the like. Communication interface 220 may include a wireless interface and/or wired interface. Communication interface 220 may include interfaces according to LTE communication standards.

As described herein, device 200 may perform operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 3B:
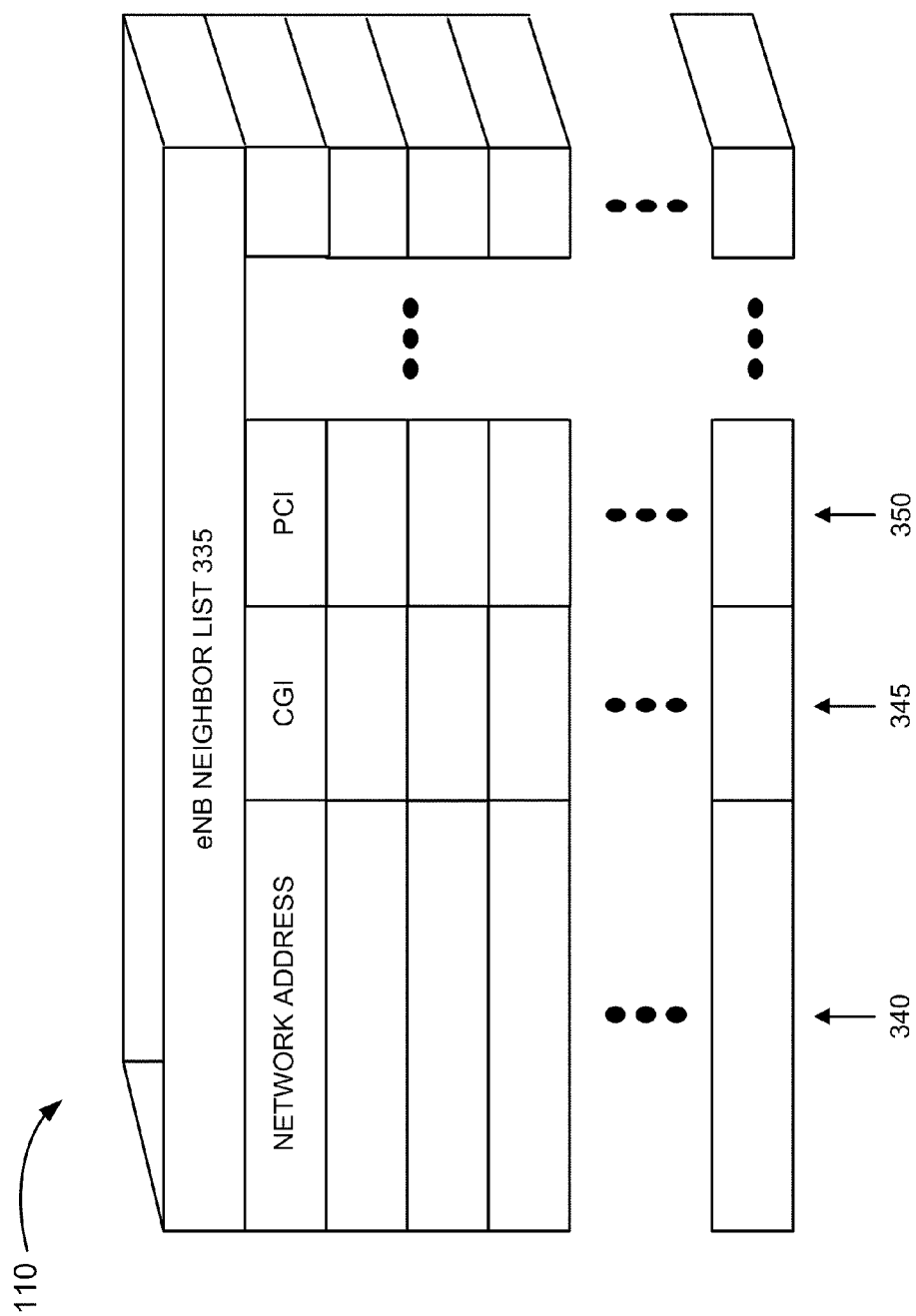
FIG. 3B is a diagram illustrating an exemplary eNB neighbor list.

As previously described, in an exemplary implementation, a wireless node (e.g., eNB 110) may operate according to one or more versions of the LTE communication standard. Additionally, in other exemplary implementations, eNB 110 may operate according to access technologies (e.g., radio access technologies, etc.) other than LTE. Further, eNB 110 may perform functions associated with data offloading. FIGS. 3A and 3B are diagrams illustrating exemplary components associated with eNB 110 to perform data offloading.

FIG. 3A is a diagram illustrating exemplary functional components associated with an exemplary implementation of a wireless node (e.g., eNB 110). As illustrated, eNB 110 may include a packet inspector 305, an IP address comparer 310, an IP address converter 315, a neighbor list manager (NLM) 320, a UE list manager (UE LM) 325, and a bearer link manager (BLM) 330. Packet inspector 305, IP address comparer 310, IP address converter 315, NLM 320, UE LM 325, and/or BLM 330 may be implemented as a combination of hardware (e.g., processing system 205, etc.) and software (e.g., applications 215, etc.) based on the components illustrated and described with respect to FIG. 2. Alternatively, packet inspector 305, IP address comparer 310, IP address converter 315, NLM 320, UE LM 325, and/or BLM 330 may be implemented as hardware based on the components illustrated and described with respect to FIG. 2. It will be appreciated that other devices in network 100 may include one or more of these functional components.

Packet inspector 305 may inspect packets associated with a data flow to determine whether data offloading should be performed.

IP address comparer 310 may compare IP addresses associated with a data flow. By way of example, but not limited thereto, IP address comparer 310 may compare IP addresses of eNBs 110. In an exemplary implementation, IP address comparer 310 may compare an IP address of a source eNB 110 with an IP address of a destination eNB 110 associated with the data flow. IP address comparer 310 may determine whether the IP addresses are the same. In the instance that the IP address of the source eNB 110 and the IP address of the destination eNB 110 match (i.e., the IP addresses are the same), IP address comparer 310 may determine that data offloading is permitted based on, for example, static policies in eNB 110 and/or interactions with PCRF 130/HSS 140 for dynamic policies. IP address comparer 310 may provide the IP address to IP address converter 315. Additionally, IP address comparer 310 may provide the IP address of UE 105 associated with the data flow to IP address converter 315.

In the instance that the IP addresses are not the same, IP address comparer 310 may access an eNB neighbor list, described further below in FIG. 3B, to determine whether the IP address of the source eNB 110 corresponds to a neighbor eNB 110. If the IP address of the source eNB 100 corresponds to an IP address of a neighbor eNB 110, IP address comparer 310 may determine that data offloading is permitted. IP address comparer 310 may provide the IP address associated with the source/neighbor eNB 110 to IP address converter 315. Additionally, IP address comparer 310 may provide the IP addresses of UE 105 associated with the data flow to IP address converter 315.

In the instance that the IP address of the source eNB 110 may not be the same as the IP address of the destination eNB 110 and/or the IP address of the source eNB 110 does not correspond to a neighbor eNB 110, IP address comparer 310 may determine that data offloading is not permitted.

IP address converter 315 may convert IP addresses to a link layer identifier. By way of example, but not limited thereto, IP address converter 315 may convert the IP address associated with the source eNB 110 to a combination of a cell global identifier (CGI) and a physical cell identifier (PCI). Additionally, IP address converter 315 may convert IP addresses of UE 105 associated with the data flow to an identifier (e.g., a C-RNTI, etc.).

NLM 320 may generate and manage a neighbor list. The neighbor list may include information relating to neighbor eNBs 110. An example of the neighbor list is described in greater detail below with respect to FIG. 3B.

UE LM 325 may generate and manage a UE list. The UE list may include information relating to UE 105. An example of the UE list is described in greater detail below with respect to FIG. 3C.

BLM 330 may manage data offloading. For example, BLM 330 may coordinate radio bearer links within an eNB 110 (e.g., when the IP addresses of the source eNB 110 and the destination eNB 110 are the same) or between eNBs 110 (e.g., when the IP addresses of the source eNB 110 corresponds to a neighbor eNB 110). BLM 330 may perform link layer routing based on eNB neighbor list 335 and UE list 355 (e.g., utilizing the link layer identifiers and the physical identifiers).

Although FIG. 3A illustrates exemplary functional components of eNB 110, in other implementations, eNB 110 may include fewer functional components, additional functional components, different functional components, and/or a different arrangement of functional components than those illustrated in FIG. 3A and described. Additionally, or alternatively, one or more operations described as being performed by a particular functional component may be performed by one or more other functional components, in addition to or instead of the particular functional component, and/or one or more functional components may be combined.

FIG. 3B is a diagram illustrating an exemplary eNB neighbor list 335. In an exemplary embodiment, eNB 110 may store eNB neighbor list 335. As illustrated, by way of example, but not limited thereto, eNB neighbor list 335 may include a network address field 340, a CGI field 345, and a PCI field 345. In other implementations, eNB neighbor list 335 may include additional fields, fewer fields, and/or different fields than those illustrated in FIG. 3B and described. By way of example, but not limited thereto, eNB neighbor list 335 may include additional fields indicating signal strength between neighbor eNBs 110, mappings between identifiers (e.g., PCI associated with an LTE network may be mapped to a pseudorandom number (PN) offset of an EV-DO network), etc. In instances when eNB 110 supports multiple access technologies, eNB 110 may include a list for each access technology or separate lists for different access technologies. Additionally, one or more devices in network 100, other than eNB 110, may also store one or more fields of eNB neighbor list 335.

Network address field 340 may indicate an IP address (e.g., IPv4 or IPv6) that has been allocated to other wireless nodes (e.g., eNBs 110).

CGI field 345 may indicate a particular cell. In an exemplary implementation, the CGI may correspond to a string that may indicate a numerical value, a geographic name, or some other type of CGI indicator. It will be appreciated that derivatives of a CGI may be implemented, such as, for example, enhanced cell identifier (E-CID), etc.

PCI field 350 may indicate a particular cell. In an exemplary implementation, the PCI may correspond to a string that may indicate a numerical value, a geographic name, or some other type of PCI indicator. It will be appreciated that the PCI may not be globally unique within a wireless network, such as, for example, an LTE network. That is, it is possible, when numerical values are used, that two or more cells within the wireless network may have the same PCI. This is in contrast to the CGI which is globally unique within an operator network.

Figure 3C:
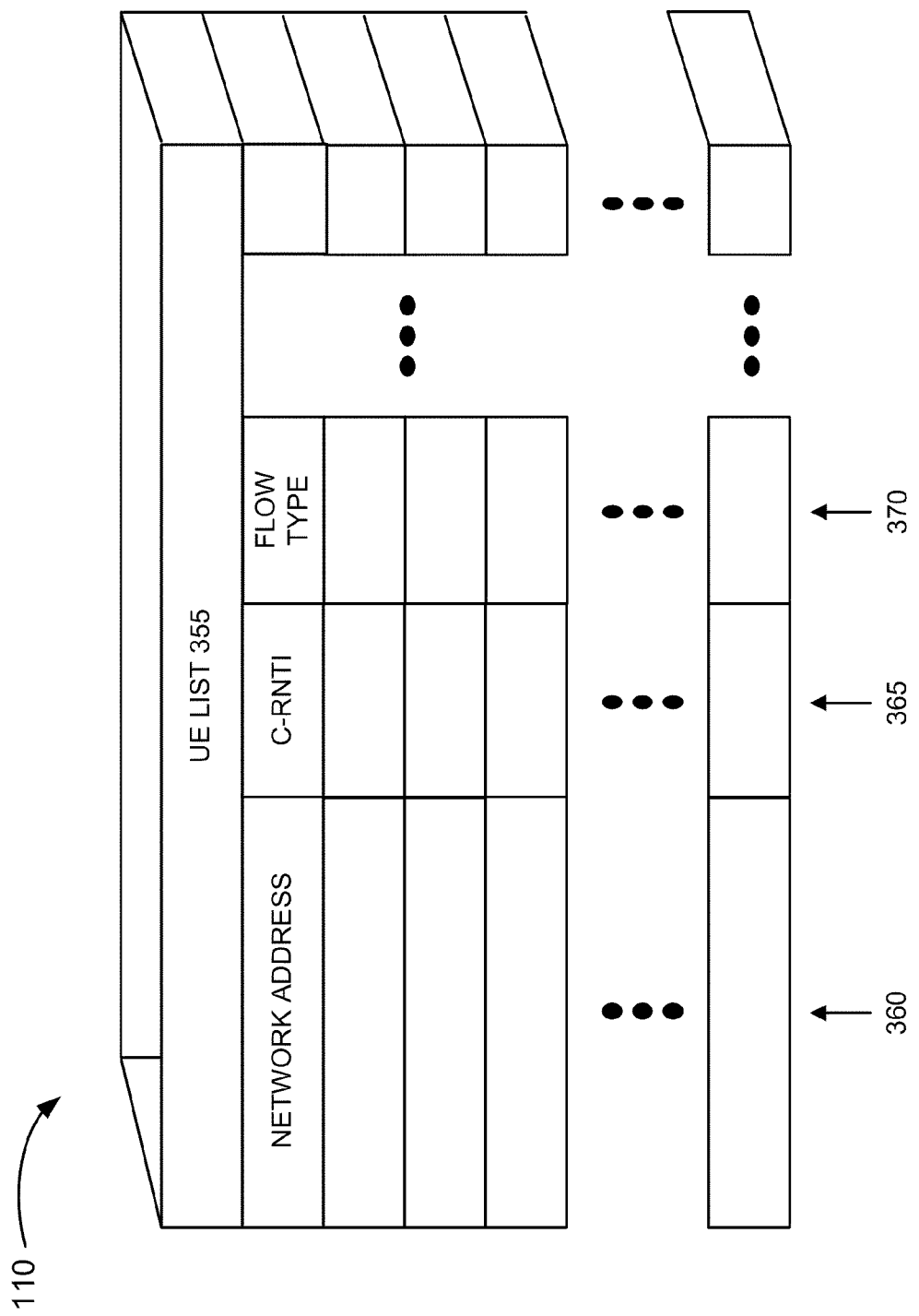
FIG. 3C is a diagram illustrating an exemplary UE list.

FIG. 3C is a diagram illustrating an exemplary UE list 355. In an exemplary embodiment, eNB 110 may store UE list 355. As illustrated, by way of example, but not limited thereto, UE list 355 may include a network address field 360, a C-RNTI field 365, and a flow type field 370. In other implementations, UE list 335 may include additional fields, fewer fields, and/or different fields than those illustrated in FIG. 3C and described. Additionally, one or more devices in network 100, other than eNB 110, may also store one or more fields of UE list 355.

Network address field 360 may indicate an IP address (e.g., IPv4 or IPv6) that has been allocated to UE 105.

C-RNTI field 365 may indicate a C-RNTI of a UE 105 associated with a data flow.

Flow type field 370 may indicate a type of data flow (e.g., type of application, etc.).

Figure 4A:
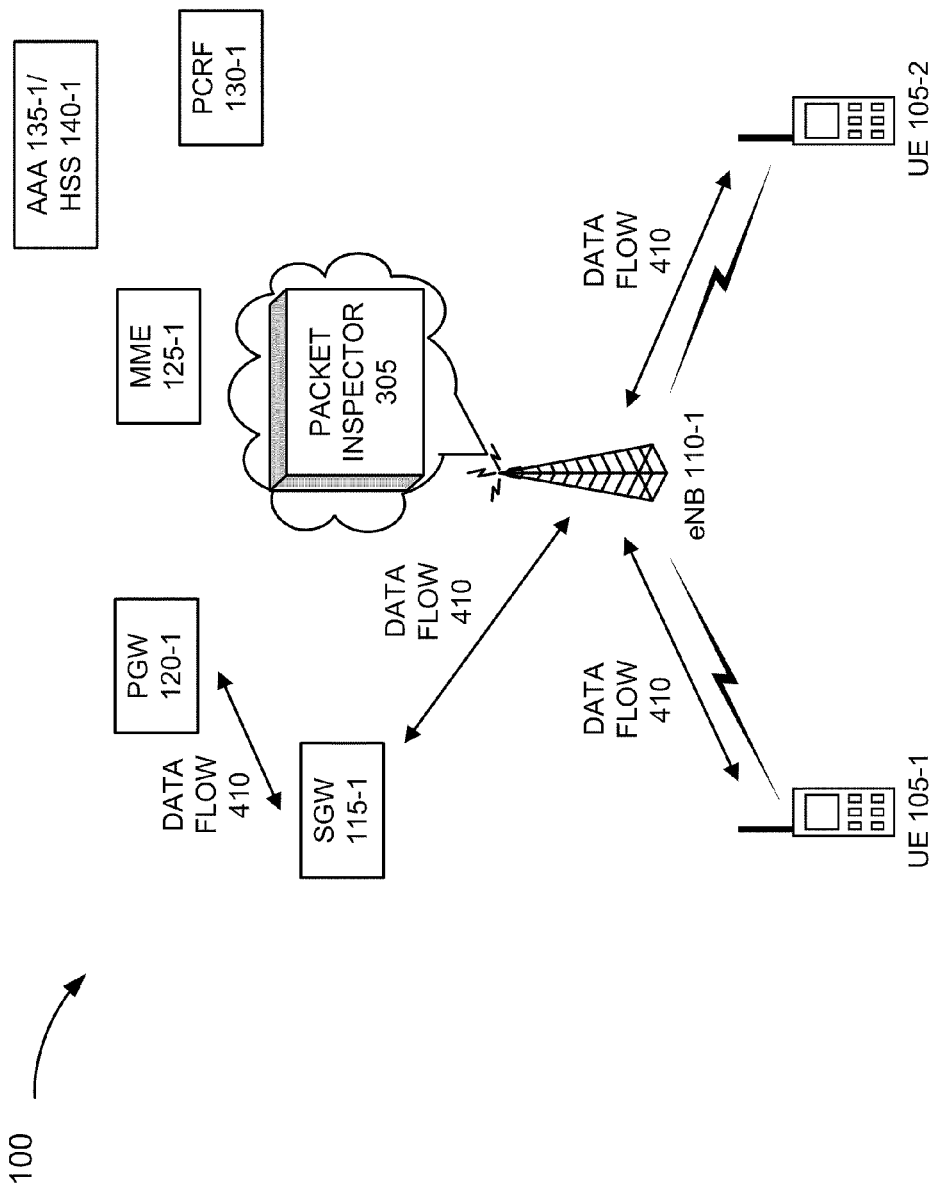
FIGS. 4A-4E are diagrams illustrating an exemplary implementation in which data offloading may be performed within the same eNB.

FIGS. 4A-4E are diagrams illustrating an exemplary implementation in which data offloading may be performed. Referring to FIG. 4A, assume UEs 105-1 and UE 105-2 have established a data flow 410 that traverses eNB 110-1, SGW 115-1, and PGW 120-1. As further illustrated, packet inspector 305 of eNB 110-1 may inspect packets associated with data flow 410. In other implementations, it will be appreciated that data offloading may be initiated by eNB 110 before data flow 410 has been established (e.g., during connection setup, etc.).

Figure 4B:
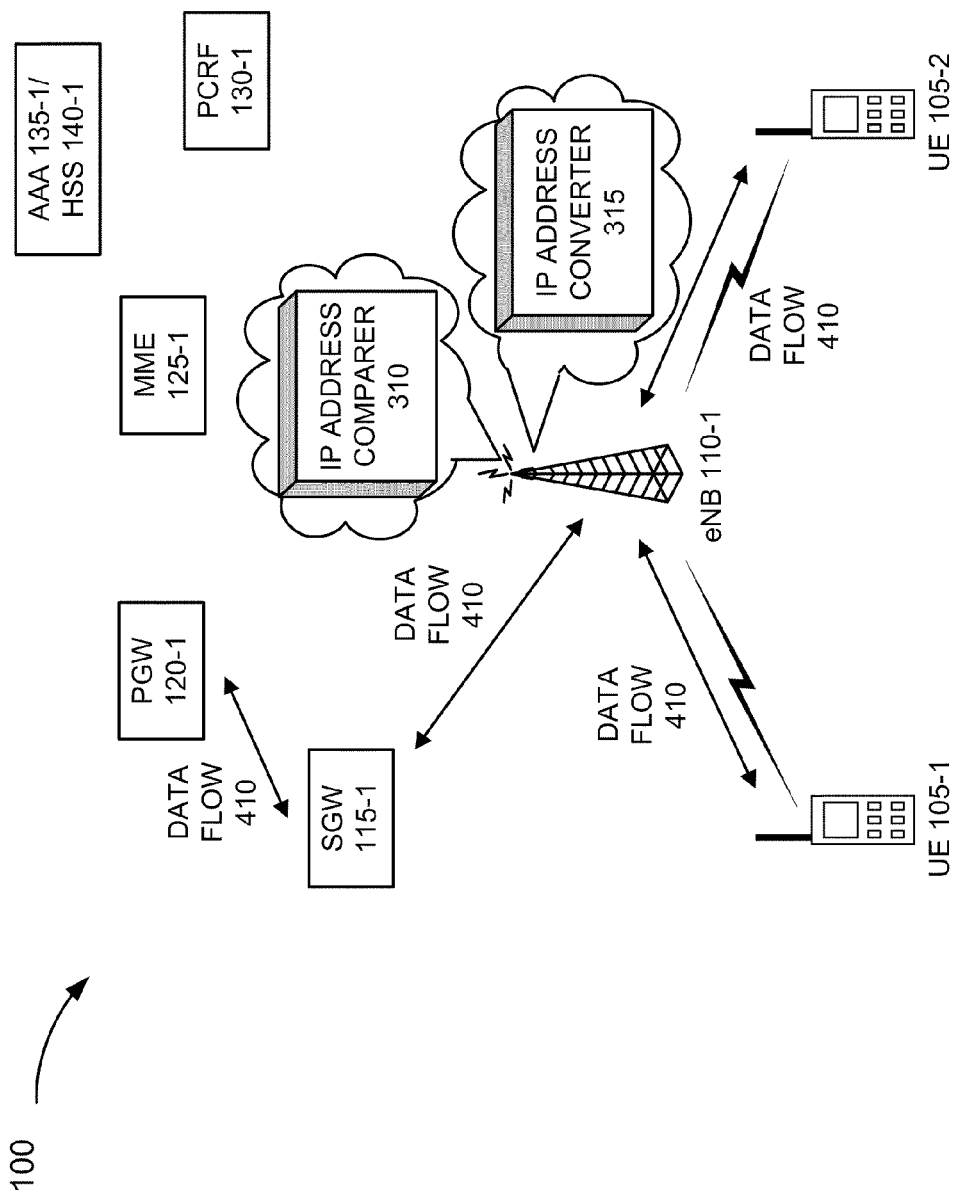

Referring to FIG. 4B, IP address comparer 310 may identify and compare the IP addresses associated with a source eNB 110 and a destination eNB 110 with respect to data flow 410. In this exemplary scenario, since UEs 105-1 and 105-2 are attached to the same eNB 110-1, IP address comparer 310 may determine that the IP addresses associated with the source eNB 110 and the destination eNB 110 match. IP address converter 315 of eNB 110-1 may convert the IP address of the source eNB 110 to a link layer identifier (e.g., CGI/PCI). IP address converter 315 may also convert the IP addresses of UE 105-1 to a physical identifier (e.g., C-RNTI). NLM 320 and UE LM 325 may generate entries for eNB neighbor list 335 and UE list 355, respectively.

Figure 4C:
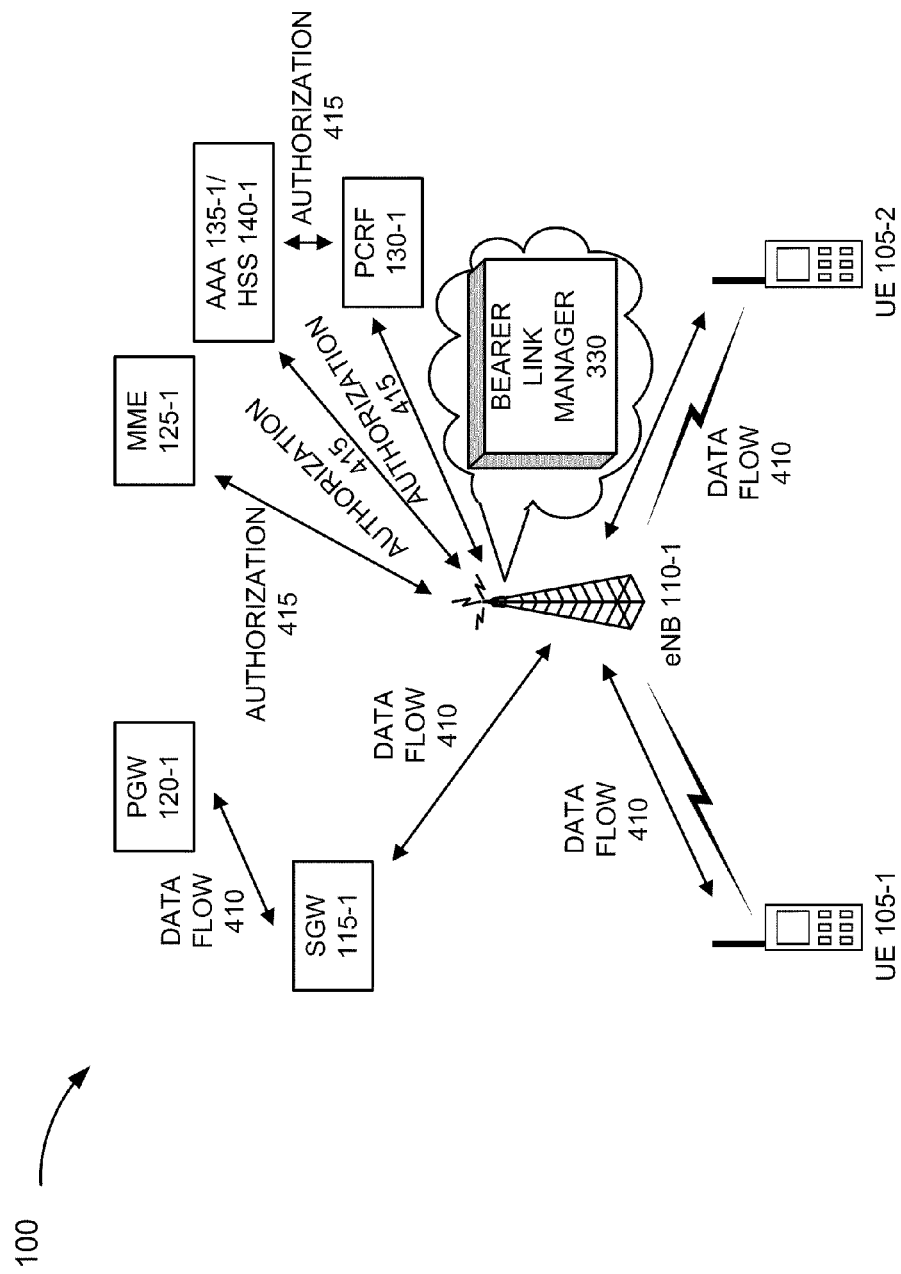

Referring to FIG. 4C, BLM 330 of eNB 110-1 may establish a bearer link within eNB 110-1 to permit data flow 410 to traverse a communication path corresponding to data offloading. For example, BLM 330 may utilize link layer identifiers and physical identifiers to perform routing of the data flow. Additionally, eNB 110-1 may obtain authorization for data offloading. By way of example, but not limited thereto, eNB 110-1 may obtain authorization 415 from one or more network devices, such as, for example, MME 125-1, AAA 135-

1/HSS 140-1, and/or a PCRF device 130-1 to ensure that data offloading is permitted. For example, if a lawful intercept (e.g., under the Communications Assistance for Law Enforcement Act (CALEA)) is provisioned for at least one of the users associated with UEs 105-1 and 105-2, MME 125-1, AAA 135-1/HSS 140-1, and/or PCRF device 130-1 may not authorize data offloading. Additionally, or alternatively, MME 125-1, AAA 135-1/HSS 140-1, and/or PCRF device 130-1 may enforce other types of restrictions (e.g., policies, subscription settings, etc.) pertaining to an authorization of the data offloading, as will be described further below.

In an exemplary implementation, eNB 110-1 may request authorization from MME 125-1 by including an attribute value pair (AVP) with a conventional message exchange between eNB 110 and MME 125-1. In another exemplary implementation, eNB 110 may utilize new messaging. Additionally, or alternatively, in an exemplary implementation, eNB 110-1 may request authorization from AAA 135-1/HSS 140-1 and/or PCRF 130-1 with new messaging. In such an embodiment, new interfaces for eNB 110, AAA 135-1/HSS 140-1, and/or PCRF 130-1 may be implemented.

Figure 4D:
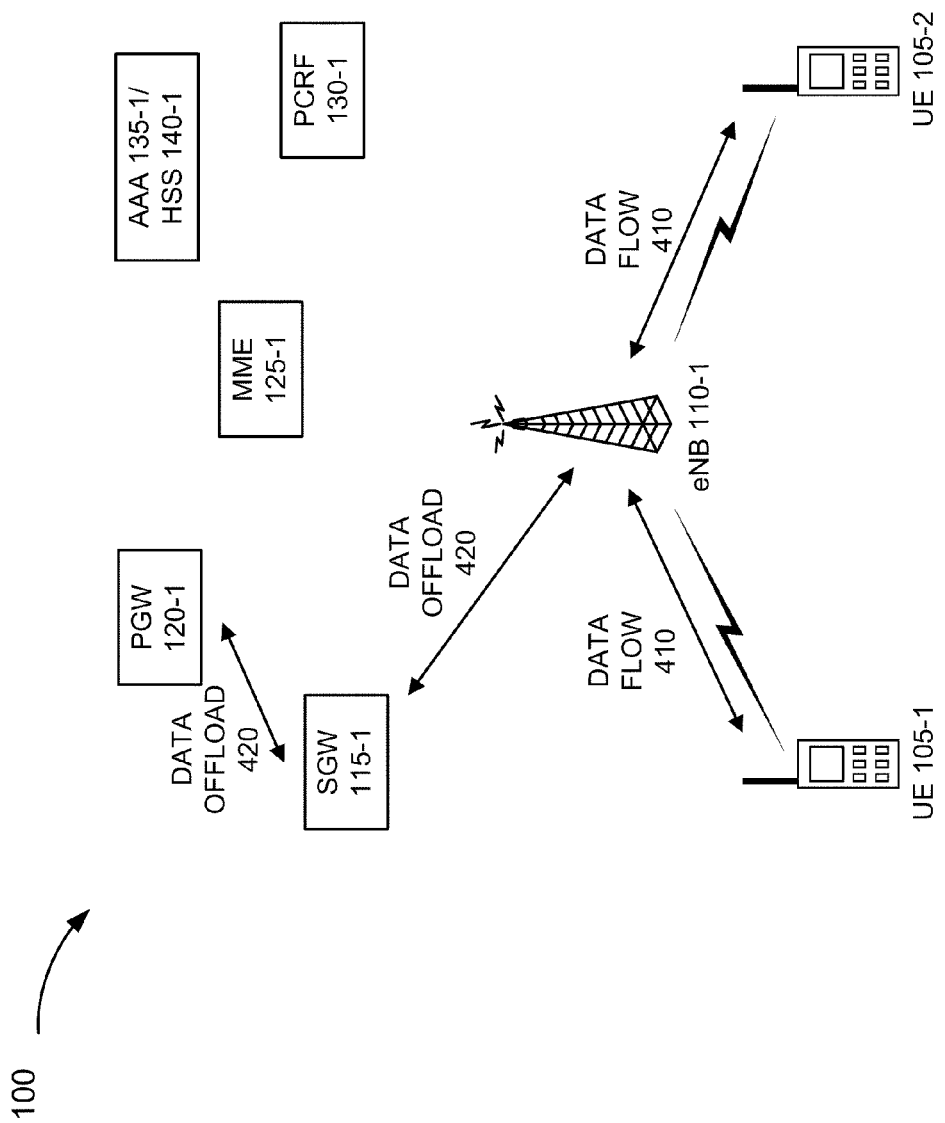

In the exemplary scenario, it may be assumed that data offloading is authorized. In an exemplary implementation, as illustrated in FIG. 4D, eNB 110-1 may provide for data offloading in which data flow 410 between UEs 105-1 and 105-2 may traverse eNB 110-1. Additionally, eNB 110-1 may inform SGW 115-1 and/or PGW 120-1 of a data offload 420. In an exemplary implementation, eNB 110-1 may inform SGW 115-1 and/or PGW 120-1 by including an AVP with a conventional message exchange. In another exemplary implementation, eNB 110-1 may utilize new messaging.

Figure 4E:
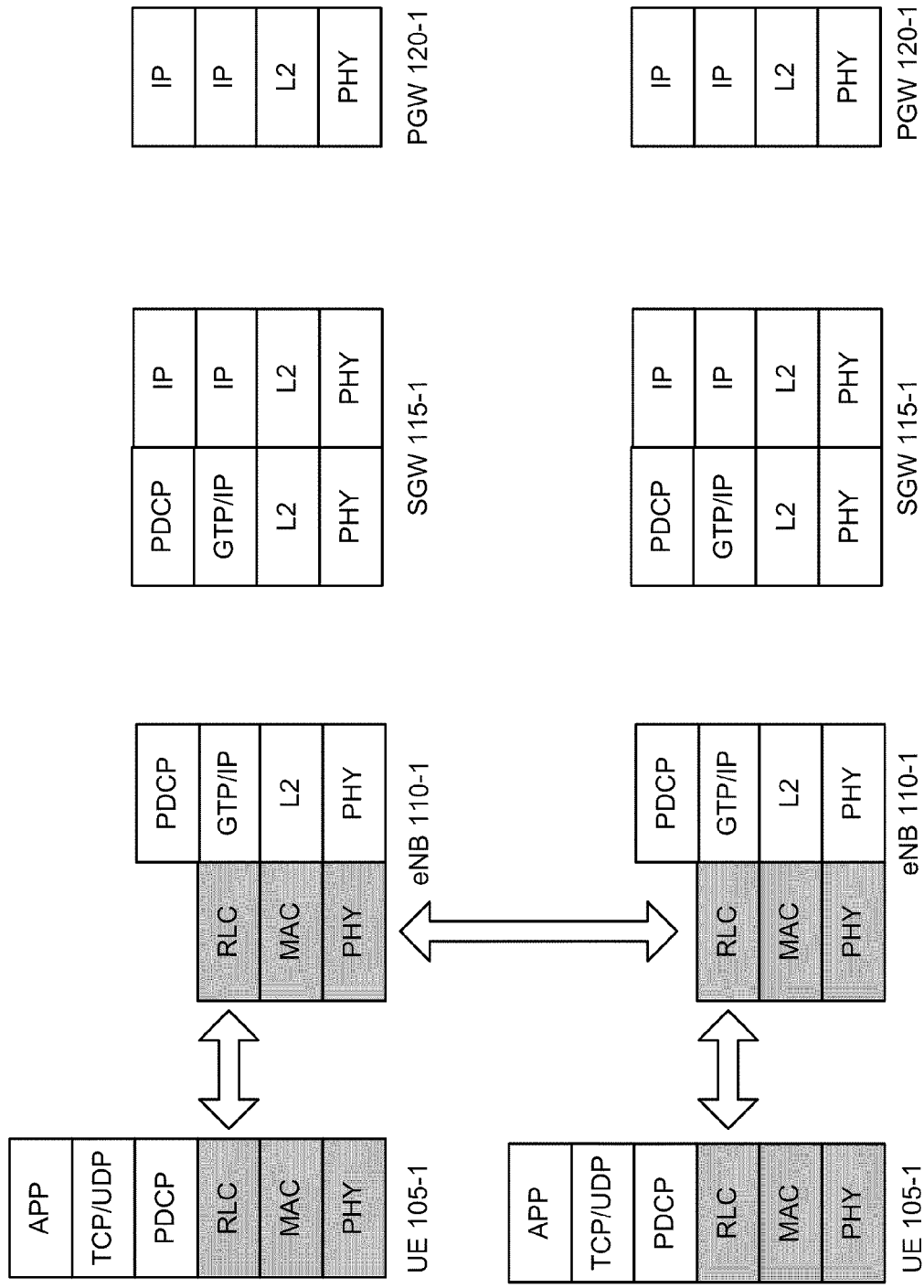

FIG. 4E is a diagram illustrating exemplary layers utilized when data offloading occurs. As illustrated in FIG. 4E, when data offloading occurs, in an exemplary implementation, eNB 110-1 may not utilize layers above a radio link control (RLC) layer. That is, eNB 110-1 may not utilize higher layers (e.g., packet data conversion protocol (PDCP), etc.). Rather, eNB 110-1 may provide data flow 410 to UEs 105-1 and 105-2 as link layer traffic. As a result, latency may be reduced, processing at eNB 110 may be reduced (e.g., elimination of encoding/decoding, etc.), resource utilization in the EPC may be reduced, etc.

As previously described, eNB 110 may obtain authorization for data offloading. In addition to CALEA, data offloading may be governed by other parameters. For example, data offloading may be limited to certain types of data flows (e.g., mobile-to-mobile flows, peer-to-peer applications, etc.) based on policy settings, subscription settings, etc., associated with the users. The type of data flow may be ascertained based on shallow packet inspection of the 5-tuple (i.e., source IP address, destination IP address, source port, destination port, and protocol) in the IP header. In other implementations, a deep packet inspection (DPI) may be performed, although this may involve a higher degree of resource utilization. As a result, data offloading may be managed on a per user level basis, or a finer granularity may be implemented in which data offloading may be managed on a per user per flow level basis.

When data offloading is performed, data offloading may exist until revocation, modification, disconnection, etc., occurs. For example, if a lawful intercept (e.g., under the CALEA) is provisioned, PGW 120 may revoke data offloading by including an AVP in a modify bearer request message, which may be sent to eNB 110. The AVP may indicate that data offloading is revoked. Additionally, PGW 120 may modify data offloading by including an AVP in a modify bearer request message to alter a lifetime or a duration of the data offloading, alter the type of bearer flow that is acceptable to have data offloading, etc. Alternatively, UE 105 may disconnect from eNB 110, which may cause data offloading to cease. In such instances, eNB 110 may inform SGW 115, PGW 120, and/or MME 125.

As illustrated in FIGS. 4A-4D, users may be attached to the same eNB 110. However, there may be other instances in which users may be attached to different eNBs 110. FIGS. 5A-5E are diagrams illustrating another exemplary implementation in which data offloading may be performed.

Figure 5A:
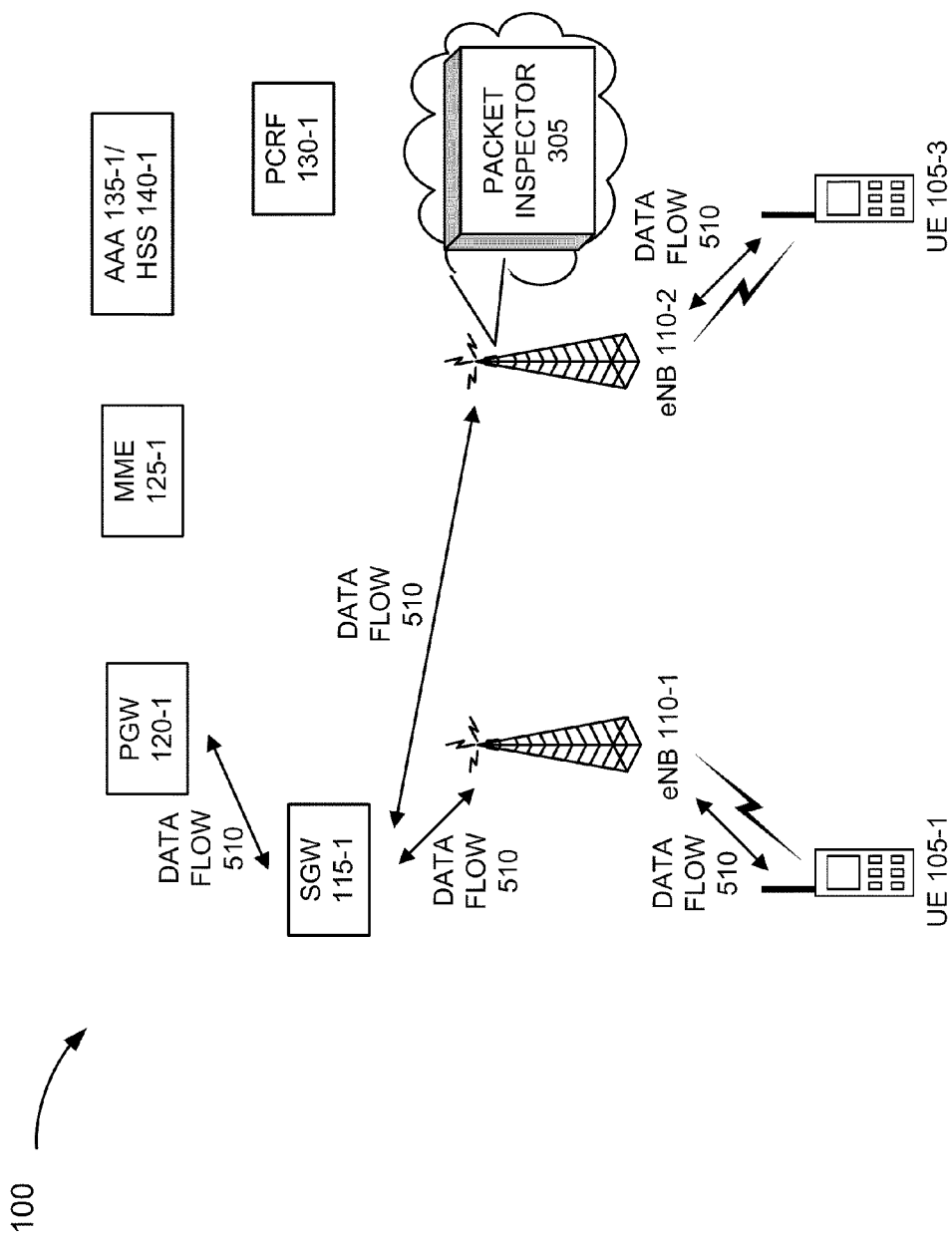

Referring to FIG. 5A, assume UE 105-1 may be attached to eNB 110-1 and UE 105-3 may be attached to eNB 110-2. Additionally, it may be assumed that UEs 105-1 and 105-3 have established a data flow 510 that traverses eNB 110-1, SGW 115-1, PGW 120-1, and eNB 110-2. As further illustrated, packet inspector 305 of eNB 110-2 may inspect packets associated with data flow 510. In other implementations, it will be appreciated that data offloading may be initiated by eNB 110-2 before data flow 510 has been established (e.g., during connection setup, etc.).

Figure 5B:
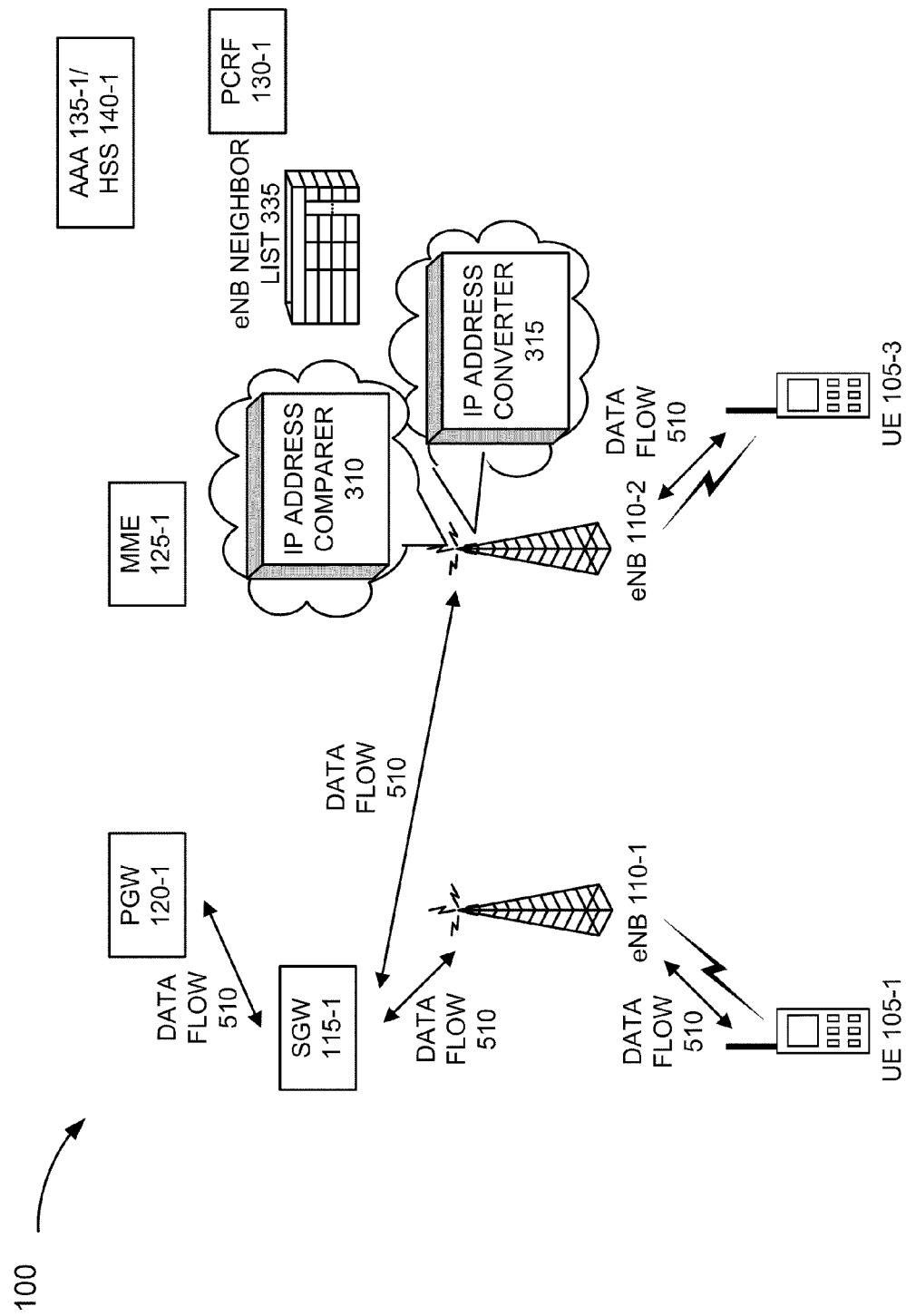

Referring to FIG. 5B, IP address comparer 310 may identify and compare the IP addresses associated with a source eNB 110 and a destination eNB 110 with respect to data flow 510. In this exemplary scenario, since UEs 105-1 and 105-3 are attached to different eNBs 110, IP address comparer 310 may determine that the IP addresses do not match. In this instance, IP address comparer 310 may access eNB neighbor list 335. For example, IP address comparer 310 may perform a look-up in network address fields 340. It may be assumed that eNB 110-1 is considered a neighbor eNB 110 and that an entry for eNB 110-1 exists in eNB neighbor list 335. In this instance, IP address comparer 310 may determine that the IP address of the source eNB 110 corresponds to an IP address of the neighbor eNB 110. IP address converter 315 of eNB 110-2 may covert the IP address of the source eNB 110 to a link layer identifier (e.g., CGI/PCI) based on CGI field 345 and PCI field 350 of eNB neighbor list 335 and/or based on layer 2 information provided in the inspected packets of data flow 510. IP address converter 315 may also convert the IP address of UE 105-1 to a physical identifier (e.g., C-RNTI). NLM 320 and UE LM 325 may generate entries for eNB neighbor list 335 and UE list 355, respectively.

Figure 5C:
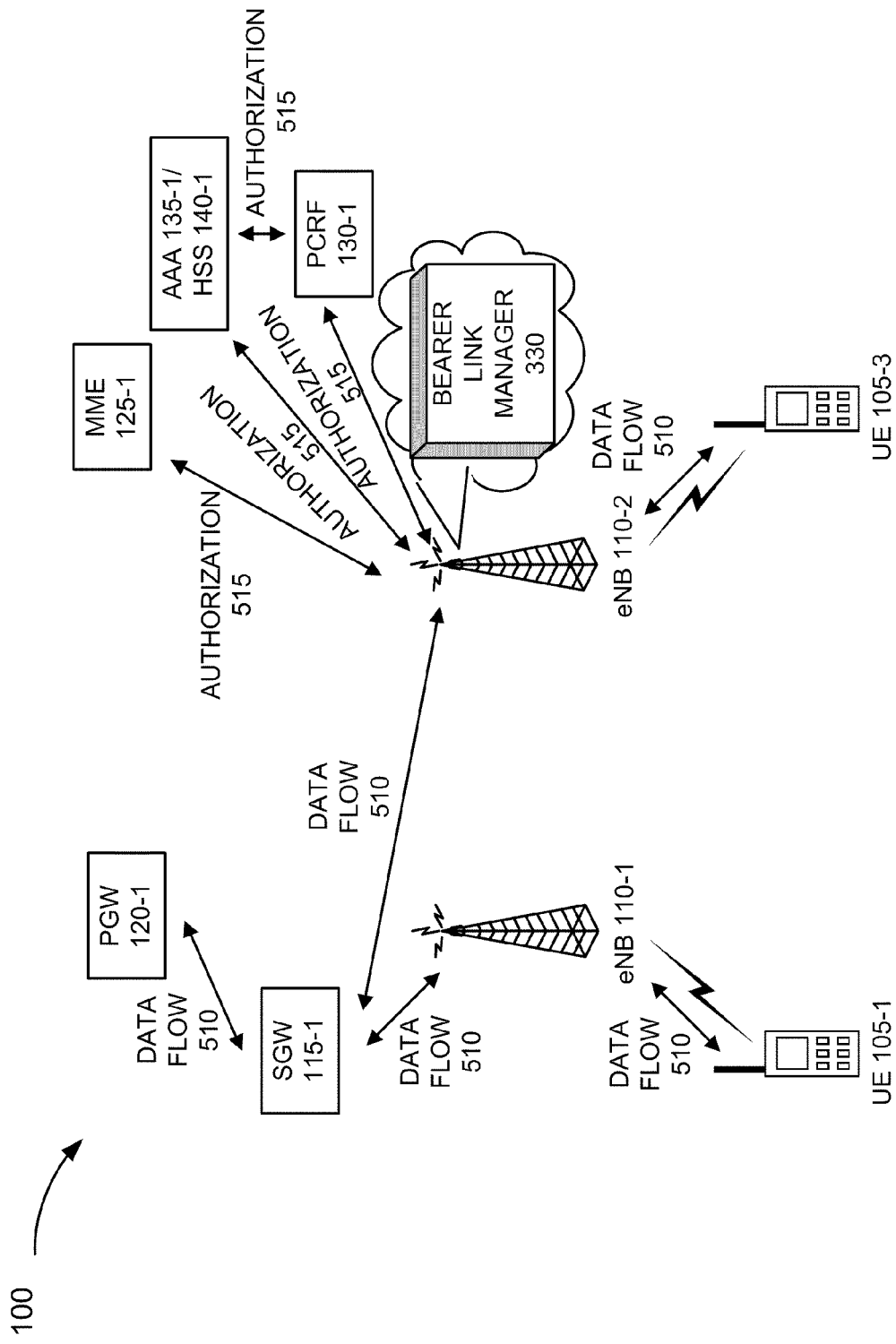

Referring to FIG. 5C, BLM 330 of eNB 110-2 may establish a bearer link with eNB 110-1 to permit data flow 510 to traverse a communication path corresponding to data offloading. For example, BLM 330 may utilize link layer identifiers and physical identifiers to perform routing of the data flow. Additionally, eNB 110-2 may obtain authorization 515 for data offloading. By way of example, but not limited thereto, as previously described, eNB 110-2 may obtain authorization from one or more network devices, such as, for example, MME 125-1, AAA 135-1/HSS 140-1, and/or PCRF device 130-1 to ensure that data offloading is permitted.

In the exemplary scenario, it may be assumed that data offloading is authorized. Thus, as illustrated in FIG. 5D, eNB 110-2 may provide for data offloading in which data flow 510 between UEs 105-1 and 105-3 may traverse eNB 110-1 and eNB 110-2. Additionally, eNB 110-1 may inform SGW 115-1 and/or PGW 120-1 of a data offload 520.

Figure 5E:
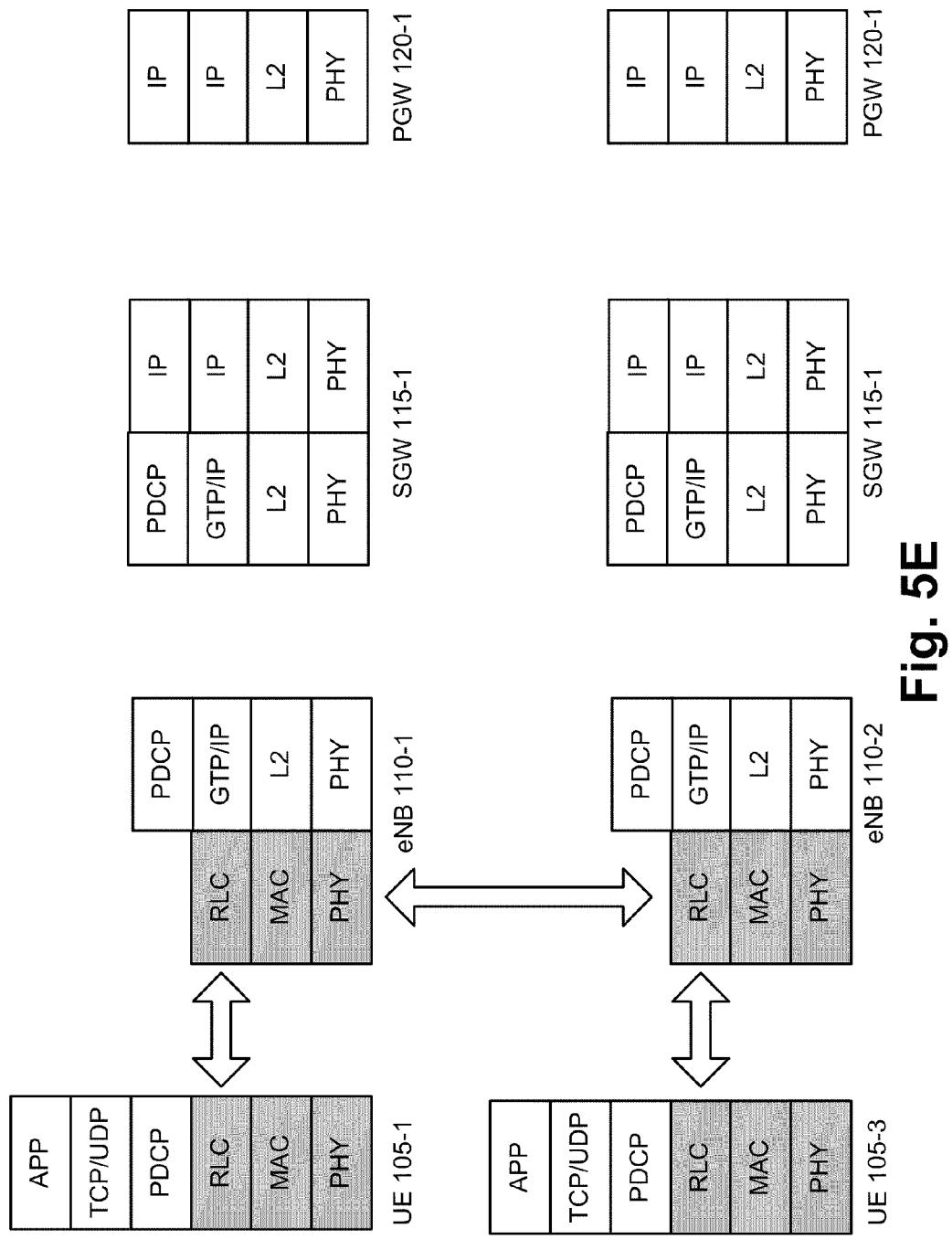

FIG. 5E is a diagram illustrating exemplary layers utilized when data offloading occurs. As illustrated in FIG. 5E, when data offloading occurs, in an exemplary implementation, eNB 110-1 and eNB 110-2 may not utilize layers above the RLC layer. ENB 110-1 and eNB 110-2 may provide data flow 510 to UEs 105-1 and 105-3 as link layer traffic.

As described herein, eNBs 110 may proactively examine data flows to determine whether data offloading may be provided. While FIGS. 4A-5E illustrate exemplary implementations for providing data offloading, in other implementations, fewer, different, and/or additional operations may be performed. Additionally, or alternatively, in other implementations, an order in which operations for performing data offloading may be different. By way of example, but not limited thereto, eNB 110 may obtain authorization for data offloading before or concurrently with packet inspection, IP address comparison, and/or IP address conversion.

Figure 6A:
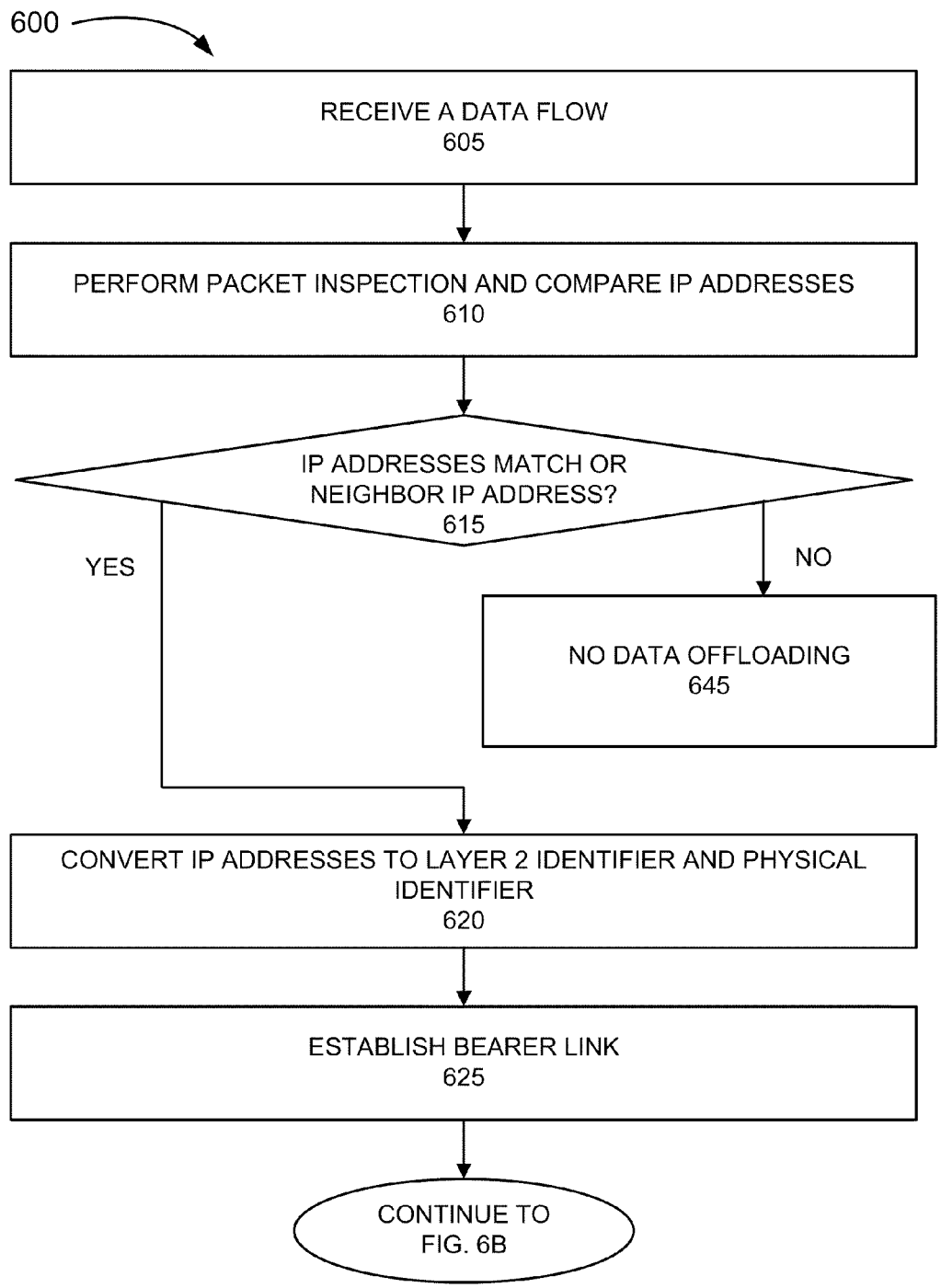
FIGS. 6A and 6B are flow diagrams illustrating an exemplary process for providing data offloading.
Figure 6B:
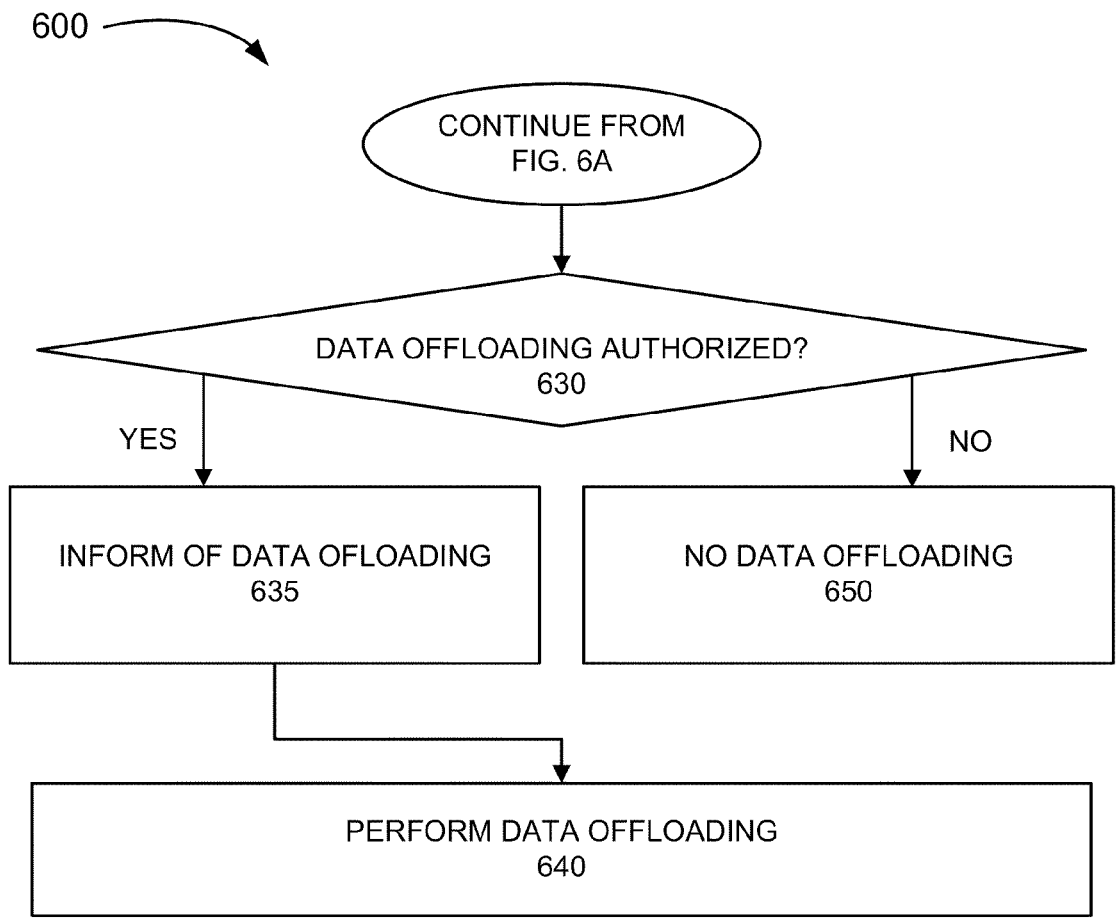

FIGS. 6A and 6B are flow diagrams illustrating an exemplary process 600 for providing data offloading. In an exemplary implementation, process 600 may be performed by eNB 110. In other implementations, process 600 may be performed by a different type of wireless node.

Process 600 may include receiving a data flow (block 605). For example, as previously illustrated and described, eNB 110 may receive a data flow. By way of example, but not limited thereto, the data flow may correspond to a mobile-to-mobile flow, a peer-to-peer application flow, etc.

Packet inspection and comparison of IP addresses may be performed (block 610). For example, packet inspector 305 may inspect packets associated with the data flow. IP address comparer 310 may compare an IP address associated with a source eNB 110 with an IP address associated with a destination eNB 110.

It may be determined whether the IP addresses match or whether one of the IP addresses is associated with a neighbor eNB (block 615). For example, IP address comparer 310 may determine whether the IP addresses match based on the comparing. As previously described, in some instances UEs 105 may be attached to the same eNB 110. In such instances, IP address comparer 310 may determine that the IP addresses match. In other instances, UEs 105 may be attached to different eNBs 110. In such instances, IP address comparer 310 may access network address fields of eNB neighbor list 335 to determine whether the IP address of the source eNB 110 corresponds to a neighbor eNB 110. In the instance that IP address comparer 310 locates the IP address of the source eNB 110 in eNB neighbor list 335, IP address comparer 310 may determine that the IP addresses match.

If it is determined that the IP addresses match or one of the IP addresses is associated with the neighbor eNB (block 615—YES), IP addresses may be converted to a link layer identifier and a physical identifier (block 620). For example, IP address converter 315 may convert the IP address associated with the source eNB 110 to the link layer identifier. In an exemplary implementation, the link layer identifier may correspond to a combination of the CGI and the PCI. Additionally, IP address converter 315 may convert the IP address of UE 105 to a physical identifier. In an exemplary implementation, the physical identifier may correspond to a RNTI (e.g., a C-RNTI).

If it is determined that the IP addresses do not match and one of the IP address is not associated with the neighbor eNB (block 615—NO), data offloading may not be performed (block 645). For example, IP address comparer 310 may determine that data offloading may not be performed.

In continuation from block 620, a bearer link may be established (block 625). For example, BLM 330 may establish a bear link with source eNB 110. BLM 330 may utilize link layer identifiers and physical identifiers to perform routing of the data flow.

Referring to FIG. 6B, it may be determined whether data offloading is authorized (block 630). For example, eNB 110 may obtain authorization for data offloading. By way of example, but not limited thereto, eNB 110 may obtain authorization from one or more network devices, such as, for example, MME 125, AAA 135/HSS 140, and/or PCRF 130 to ensure that data offloading is permitted.

If it is determined that data offloading is authorized (block 630—YES), other devices may be informed of data offloading (block 635). For example, source eNB 110 may inform SGW 115 and/or PGW 120 of the data offloading.

Data offloading may be performed (block 640). For example, the data flow may not traverse higher layers of an LTE network. By way of example, but not limited thereto, the data flow may not traverse SGW 115 and PGW 120.

If it is determined that data offloading is not authorized (block 630—NO), data offloading may not be performed (block 650). For example, eNB 110 may determine that data offloading may not be performed.

Although FIGS. 6A and 6B illustrate an exemplary process 600 for performing data offloading, in other implementations, process 600 may include additional operations, fewer operations, and/or different operations than those illustrated in FIGS. 6A and 6B and described. For example, when the wireless node does not correspond to eNB 110, authorization may be obtained from device(s) different than those described in process 600 and the wireless node may inform device(s) different than those described in process 600 of the data offloading.

In this description, data offloading has been described with respect to eNB 110. However, in other exemplary embodiments, other forms of offloading may be implemented. That is, the principles of offloading may be extended to SGW 115 or to another device (e.g., a home eNB, a UE-GW, or some other type of wireless node) when eNB may be unable to perform data offloading or data offloading may be further extended toward UE 105.

Figure 7A:
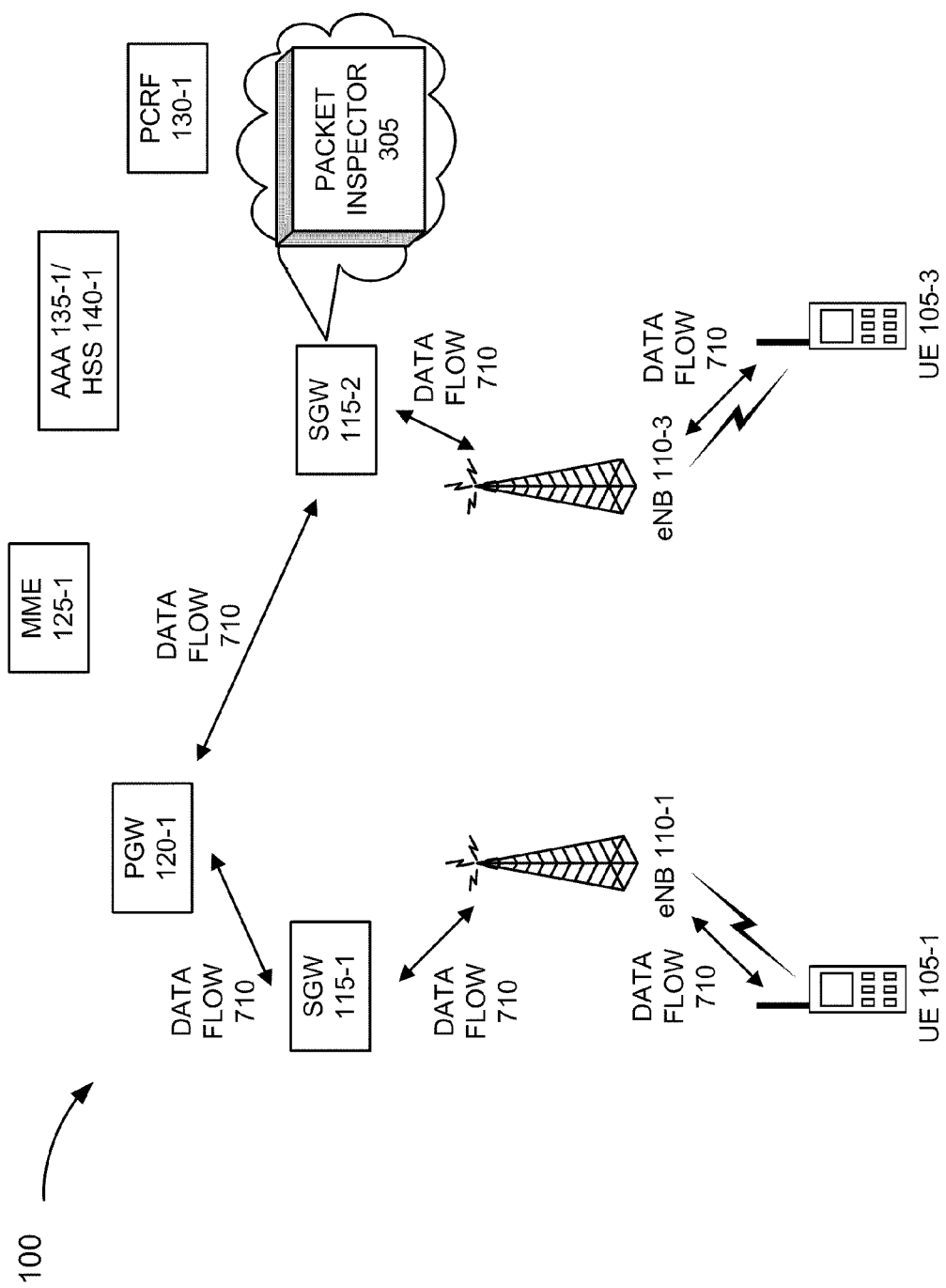
FIGS. 7A and 7B are diagrams illustrating another exemplary implementation in which data offloading may be performed between eNBs belonging to different serving gateways.
Figure 7B:
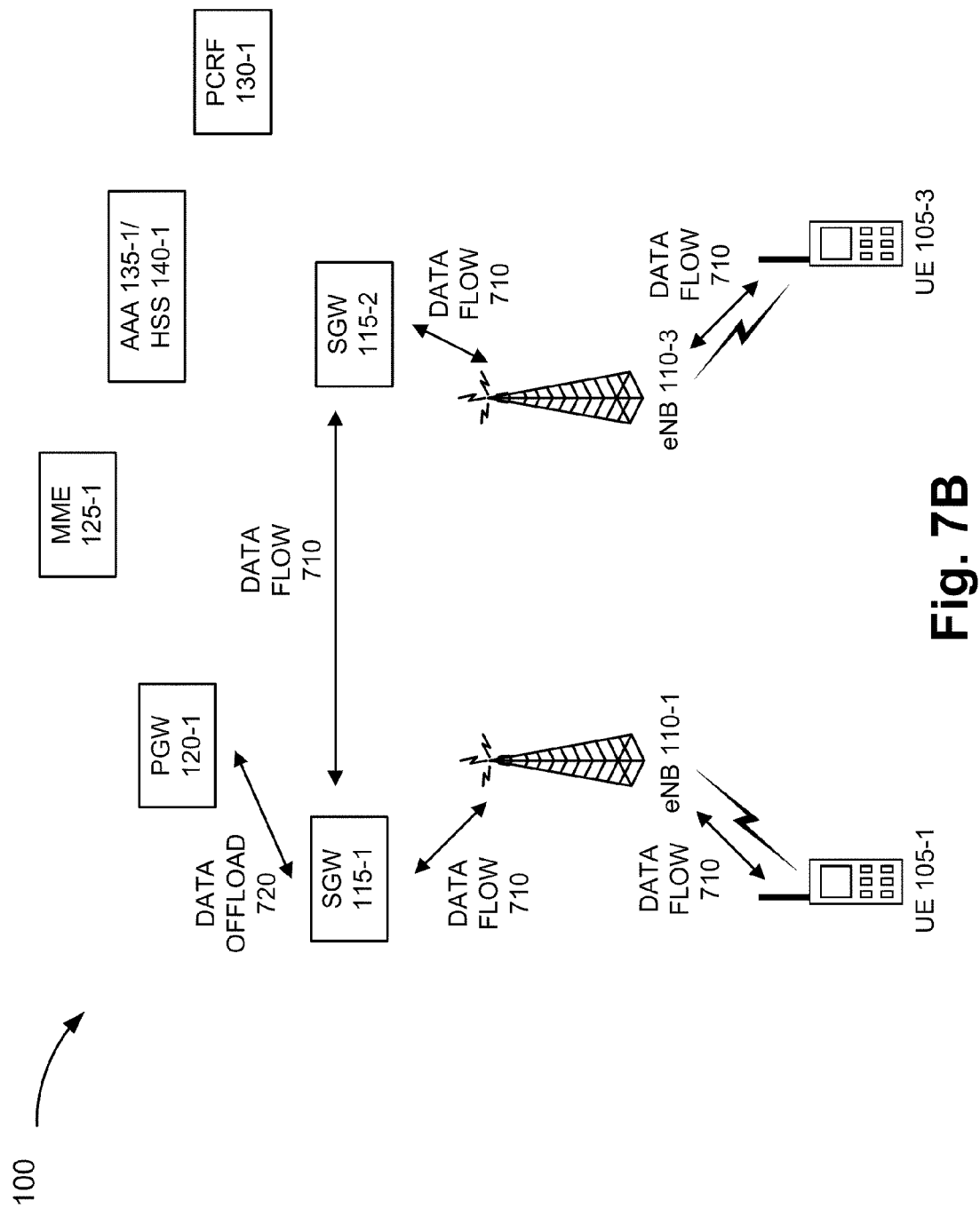

FIGS. 7A and 7B are diagrams illustrating another exemplary implementation in which data offloading may be performed. In this example, it may be assumed that eNB 110-1 and eNB 110-3 are not neighbor eNBs 110. Referring to FIG. 7A, packet inspector 305 of SGW 115-2 may perform packet inspection with respect to data flow 710. Although not illustrated, it may be assumed that IP address comparer 310 of SGW 115-2 may determine that SGW 115-1 is a neighbor SGW. Additionally, it may be assumed that BLM 330 of SGW 115-2 may establish a bearer link between SGW 115-1 and SGW 115-2 and that data offloading is authorized. Referring to FIG. 7B, SGW 115-1 and SGW 115-2 may provide for data offloading in which data flow 710 between UEs 105-1 and 105-3 may traverse SGW 115-1 and SGW 115-2. Additionally, SGW 115-1 may inform PGW 120-1 of a data offload 720. In this example, data flow 710 may not traverse PGW 120-1.

In another exemplary embodiment, data offloading may be extended to other devices (e.g., a home eNB, a UE-GW, some other type of wireless node, etc.). For example, users may be located within the same picocell, femtocell, etc. In such instances, data offloading may be extended to the home eNB or to the UE-GW.

Figure 8:
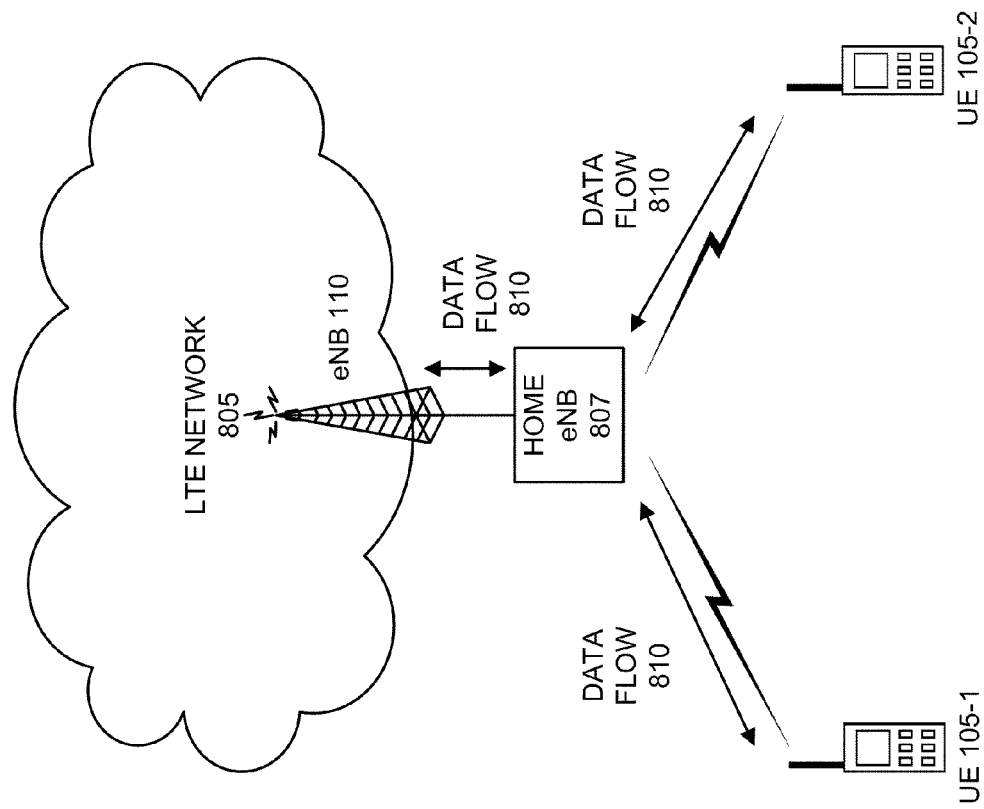
FIG. 8 is a diagram illustrating another exemplary implementation in which data offloading may be performed by a home eNB.

FIG. 8 is a diagram illustrating an exemplary environment that may include an LTE network 805 that includes, among other devices, eNB 110, and a home eNB 807 and UEs 105-1 and 105-2. In an exemplary implementation, assume that UEs 105-1 and 105-2 are situated in a home environment and that home eNB 807 may operate as an access point to LTE network 805. In such an instance, home eNB 807 may perform packet inspection and coordinate with LTE network 805 via eNB 110 for data offloading of a data flow 810. In this way, data flow 810 may not traverse the LTE network side of home eNB 807. In such an implementation, intelligent traffic management may conserve usage of resources associated within LTE network 805.

Figure 9:
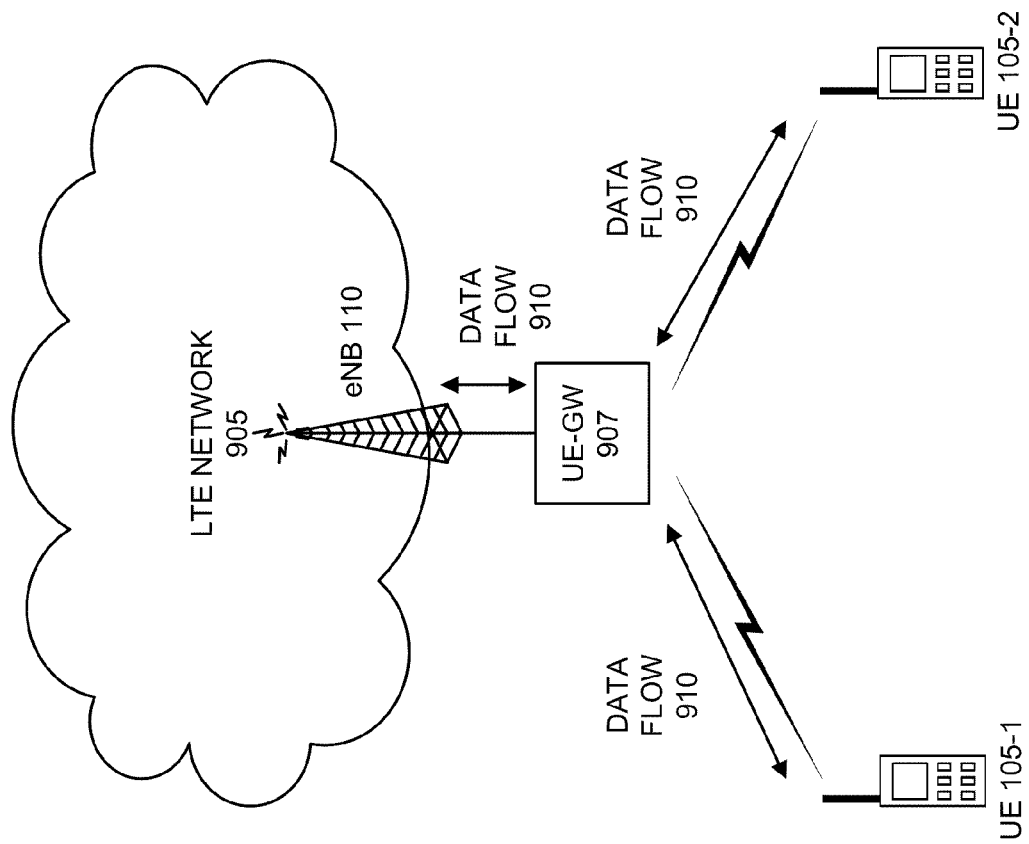
FIG. 9 is a diagram illustrating yet another exemplary implementation in which data offloading may be performed by a user equipment-gateway.

FIG. 9 is a diagram illustrating yet another exemplary environment that may include an LTE network 905 that includes, among other devices, eNB 110, and a UE-GW 907 and UEs 105-1 and 105-2. In an exemplary implementation, UE-GW 907 may perform packet inspection of data flow 910 and coordinate with LTE network 905 via eNB 110 for data offloading.

The foregoing description of implementations provides illustration, but is not intended to be exhaustive or to limit the implementations to the precise form disclosed. Accordingly, modifications to the implementations described herein may be possible. For example, as previously described, data offloading may be implemented in networks other than LTE.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 6A and 6B, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
    receiving, by a first wireless node, a data flow associated with user devices;
    performing a packet inspection of the data flow;
    determining whether a first network address of the first wireless node matches a second network address associated with the data flow;
    converting the second network address to a link layer identifier when the second network address matches the first network address, wherein the link layer identifier comprises a cell global identifier and a physical cell identifier;
    establishing a bearer link within the first wireless node based on the link layer identifier; and
    offloading the data flow from layers of a network, which are higher relative to the first wireless node, to the bearer link, wherein the data flow does not traverse the layers.

2. The method of claim 1, further comprising:
    determining whether the second network address is associated with a neighbor wireless node relative to the first wireless node when the first network address does not match the second network address.

3. The method of claim 2, wherein the first network address corresponds to an Internet Protocol (IP) address of the first wireless node and the second network address corresponds to another IP address of a second wireless node, and the method further comprises:
    accessing a neighbor list;
    determining whether the second network address of the second wireless node is included in the neighbor list; and
    determining that the second network address is associated with the neighbor wireless node when the second network address of the second wireless node is included in the neighbor list.

4. The method of claim 1, wherein the first wireless node comprises one of an evolved Node-B, a Node-B, a base station, or a radio node to which at least one of the user devices is attached.

5. The method of claim 4, wherein the network comprises a Long Term Evolution network and the layers comprise a serving gateway and a packet data network gateway.

6. The method of claim 1, further comprising:
    converting a network address associated with one of the user devices to a physical identifier, wherein the physical identifier comprises a radio network temporary identifier associated with the one of the user devices.

7. The method of claim 1, further comprising:
    obtaining authorization to perform the offloading of the data flow.

8. The method of claim 1, further comprising:
    receiving authorization to perform the offloading; and
    informing the layers of the network that the offloading is being performed.

9. The method of claim 1, wherein the offloading of the data flow is based on a per user or a per user per data flow basis, and the data flow corresponds to link layer data.

10. The method of claim 9, wherein the link layer data corresponds to compressed and encoded voice, video, or other multimedia data.

11. A wireless node comprising:
    one or more memories to store instructions; and
    one or more processors to execute the instructions in the one or more memories to:
        receive a data flow associated with user devices;
        perform a packet inspection of the data flow;
        identify a first layer 3 address of the wireless node;
        determine whether a second layer 3 address associated with the data flow matches the first layer 3 address;
        convert the second layer 3 address to a link layer identifier when the second layer 3 address matches the first layer 3 address;
        convert a layer 3 address of one of the user devices to a physical identifier;

establish a bearer link within the wireless node based on the link layer identifier and the physical identifier; and
offload the data flow from higher layers relative to the wireless node, wherein the data flow does not traverse the higher layers but traverses the bearer link.

12. The wireless node of claim 11, wherein the wireless node comprises one of a home evolved Node-B (home eNB), an eNB, a Node-B, a base station, or a radio node.

13. The wireless node of claim 12, wherein the one or more processors are to execute instructions to:
determine whether the second layer 3 address is associated with a neighbor wireless node relative to the wireless node when the second layer 3 address does not match the first layer 3 address of the wireless node.

14. The wireless node of claim 13, further comprising a neighbor list, and wherein, when determining, the one or more processors are to execute instructions to:
access the neighbor list;
determine whether the second layer 3 address is included in the neighbor list; and
determine that the second layer 3 address is associated with the neighbor wireless node when the second layer 3 address is included in the neighbor list.

15. The wireless node of claim 11, wherein the one or more processors are to execute instructions to:
inform the higher layers that offloading is being performed.

16. The wireless node of claim 11, wherein the data flow corresponds to link layer data associated with a communication between the user devices via the wireless node.

17. A wireless node comprising:
one or more memories to store instructions; and one or more processors to execute the instructions in the one or more memories to:
receive a data flow associated with user devices, wherein the data flow corresponds to link layer data associated with a communication between the user devices;
perform a packet inspection of the data flow;
determine whether a first layer 3 address of the wireless node matches a second layer 3 address associated with the data flow;
convert the second layer 3 address to a link layer identifier when the first layer 3 address matches the second layer 3 address;
determine whether the second layer 3 address is associated with a neighbor node when the first layer 3 address does not match the second layer 3 address;
convert the second layer 3 address to a link layer identifier when the second layer 3 address is associated with the neighbor node;
establish a bearer link for the data flow; and
offload the data flow from a communication path associated with higher layers relative to the wireless node, wherein the data flow does not traverse the communication path associated with the higher layers but traverses the bearer link.

18. The wireless node of claim 17, wherein the one or more processors are to execute instructions to:
convert a layer 3 address associated with one of the user devices to a physical identifier when the first layer 3 address of the wireless node matches the second layer 3 address and when the second layer 3 address is associated with the neighbor node.

19. A non-transitory computer-readable medium containing instructions executable by at least one processor, the non-transitory computer-readable medium storing instructions for:
receiving a data flow associated with user devices;
performing a packet inspection of the data flow;
determining whether a first layer 3 address of a network device in which the computer-readable medium resides matches a second layer 3 address associated with the data flow;
determining whether the second layer 3 address is associated with a neighbor network device relative to the network device when the first layer 3 address does not match the second layer 3 address;
converting the second layer 3 address to a first link layer identifier when the first layer 3 address matches the second layer 3 address;
converting the second layer 3 address to a second link layer identifier when the second layer 3 address is associated with the neighbor network device;
establishing a first bearer link within the network device for the data flow based on the first link layer identifier;
establishing a second bearer link between the network device and the neighbor network device based on the second link layer identifier; and
offloading the data flow from higher layers relative to the network device, wherein the data flow does not traverse the higher layers but traverses the first bearer link or the second bearer link.

20. The non-transitory computer-readable medium of claim 19, further comprising one or more instructions for:
accessing a neighbor list to determine whether the second layer 3 address is associated with the neighbor network device; and
converting a layer 3 address associated with at least one of the user devices to a radio network temporary identifier.

21. The non-transitory computer-readable medium of claim 19, wherein the second link layer identifier comprises a cell global identifier and a physical cell identifier.

* * * * *